United States Patent
Kommula et al.

(10) Patent No.: US 10,644,901 B2
(45) Date of Patent: May 5, 2020

(54) GENERATING FLEXIBLE, PROGRAMMABLE, AND SCALABLE NETWORK TUNNELS ON DEMAND

(71) Applicant: Juniper Networks, Inc., Sunnyvale, CA (US)

(72) Inventors: Sunanda Kommula, Cupertino, CA (US); Alex Baban, San Jose, CA (US); Dmitry A. Shokarev, Mountain View, CA (US); Jamsheed Wania, Palo Alto, CA (US); Kurt J. Windisch, Bend, OR (US); Nandan Paramashiva, Santa Clara, CA (US); Sri Karthik Goud Gadela, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 78 days.

(21) Appl. No.: 16/144,726

(22) Filed: Sep. 27, 2018

(65) Prior Publication Data
US 2020/0106641 A1 Apr. 2, 2020

(51) Int. Cl.
*H04L 12/46* (2006.01)
*H04L 12/725* (2013.01)
*H04L 12/721* (2013.01)

(52) U.S. Cl.
CPC ........ *H04L 12/4633* (2013.01); *H04L 45/306* (2013.01); *H04L 45/72* (2013.01); *H04L 2212/00* (2013.01)

(58) Field of Classification Search
CPC ... H04L 12/4633; H04L 45/306; H04L 45/72; H04L 2212/00
(Continued)

(56) References Cited

U.S. PATENT DOCUMENTS

2012/0183000 A1* 7/2012 Vasseur ............... H04L 12/4633
370/401
2013/0179551 A1* 7/2013 Li ....................... H04L 63/0272
709/223
(Continued)

FOREIGN PATENT DOCUMENTS

WO 2019147316 A1 8/2019

OTHER PUBLICATIONS

Extended European Search Report for Application No. EP19165858.2, dated Oct. 21, 2019, 8 pages.
(Continued)

*Primary Examiner* — Obaidul Huq
(74) *Attorney, Agent, or Firm* — Harrity & Harrity, LLP

(57) ABSTRACT

A device receives network information associated with a network and server information associated with one or more server devices, wherein the network is associated with a network device and the one or more server devices. The device generates, based on the network information and the server information, an encapsulation profile for a tunnel encapsulation path and a route profile for the tunnel encapsulation path. The device provides, to the network device, the encapsulation profile for the tunnel encapsulation path and the route profile for the tunnel encapsulation path, and provides, to the one or more server devices, the encapsulation profile for the tunnel encapsulation path. The tunnel encapsulation path is provided between the network device and the one or more server devices, via the network, based on the encapsulation profile for the tunnel encapsulation path and the route profile for the tunnel encapsulation path.

20 Claims, 16 Drawing Sheets

(58) Field of Classification Search
USPC .................................................. 370/351, 389
See application file for complete search history.

(56) References Cited

U.S. PATENT DOCUMENTS

2016/0308904 A1* 10/2016 Yoon ...................... H04L 63/20
2017/0295033 A1   10/2017 Cherian et al.

OTHER PUBLICATIONS

Gross J., et al., "Geneve: Generic Network Virtualization Encapsulation Draft-IETF-NV03-Geneve-07.txt", Internet-draft, Network Working Group, Internet Engineering Task Force (IETF), StandardWorkingDraft, Internet Society (ISOC) 4, Switzerland, Jul. 3, 2018, vol. 7, pp. 1-29, XP015127631 [Retrieved on Jul. 3, 2018].

* cited by examiner

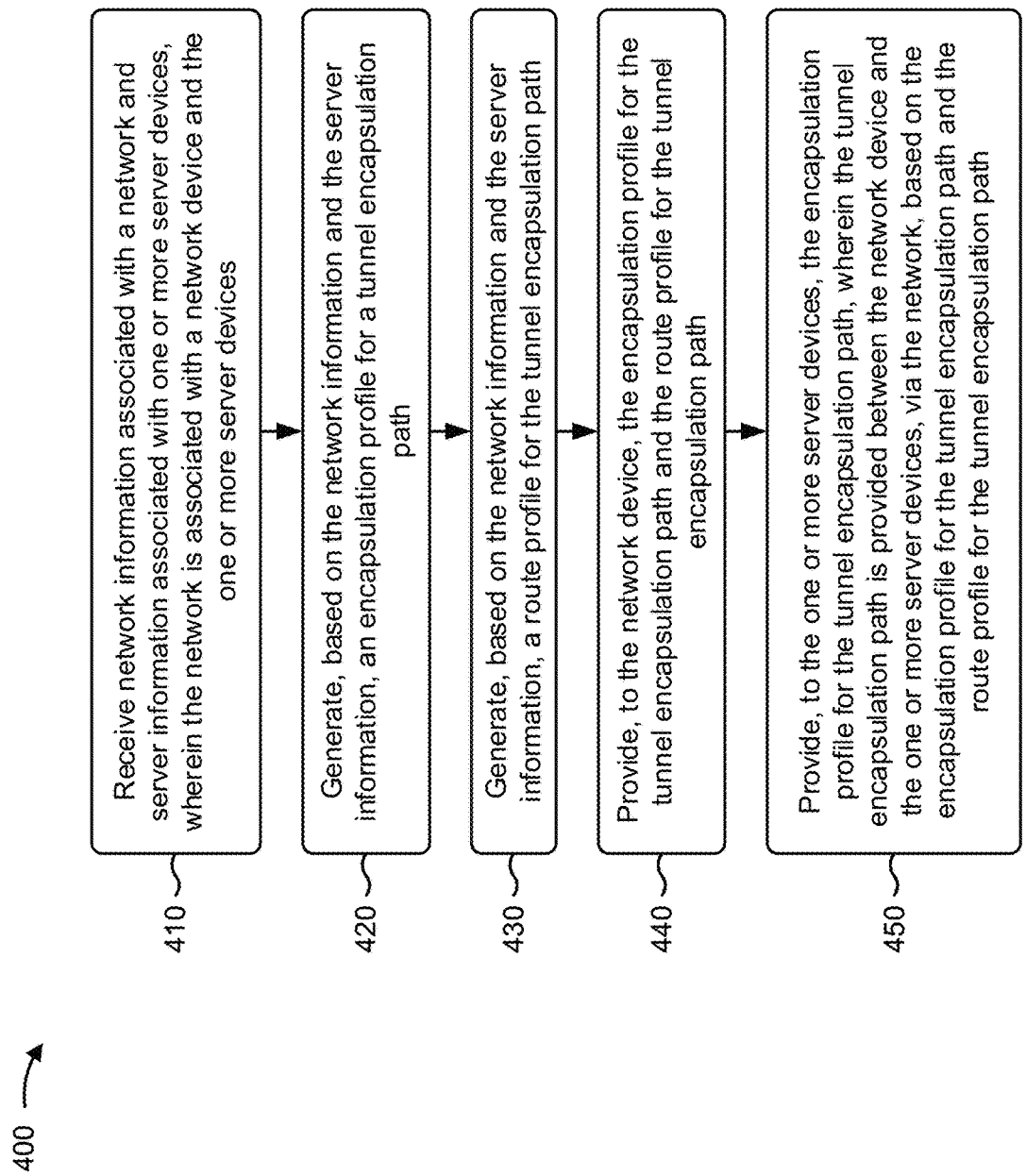

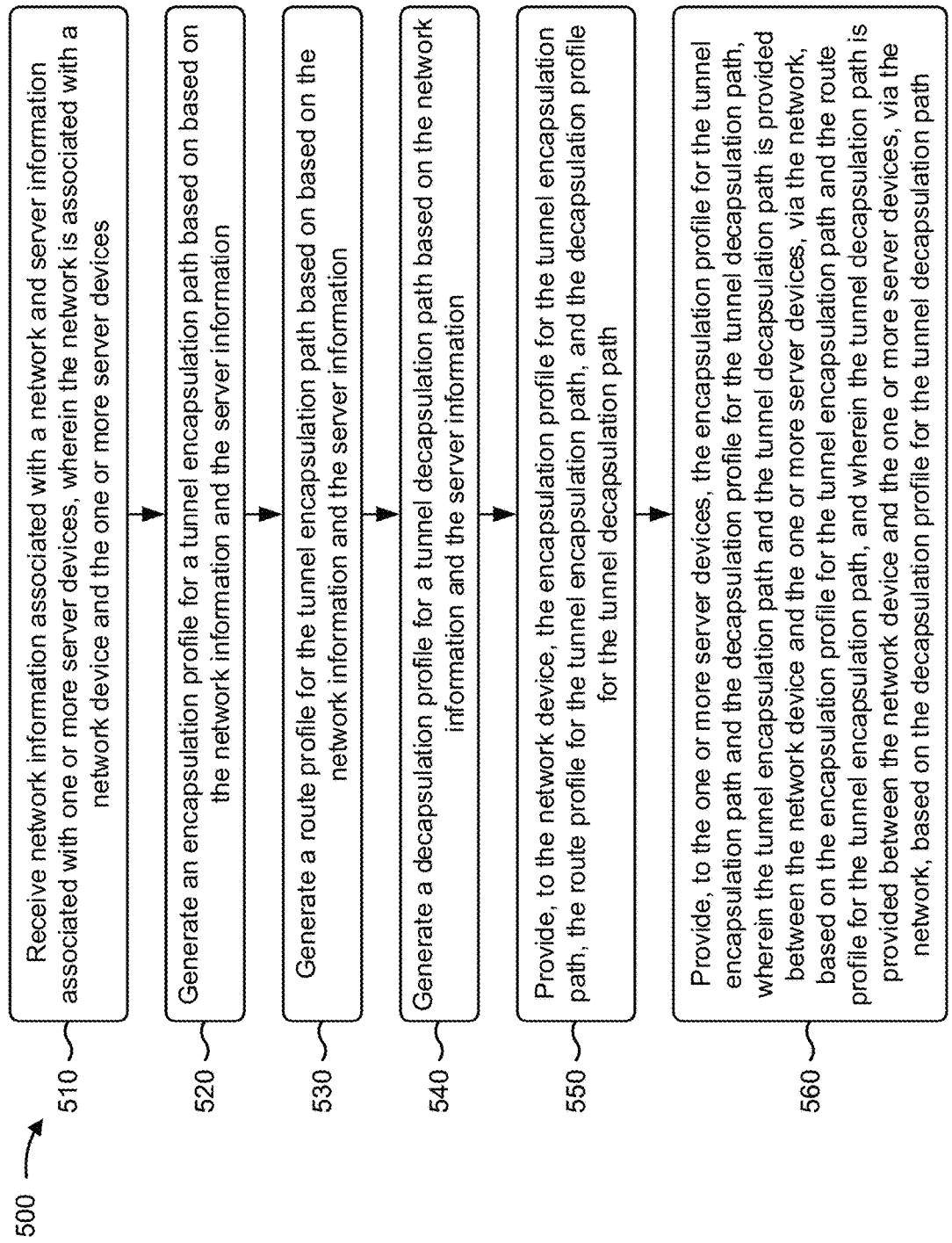

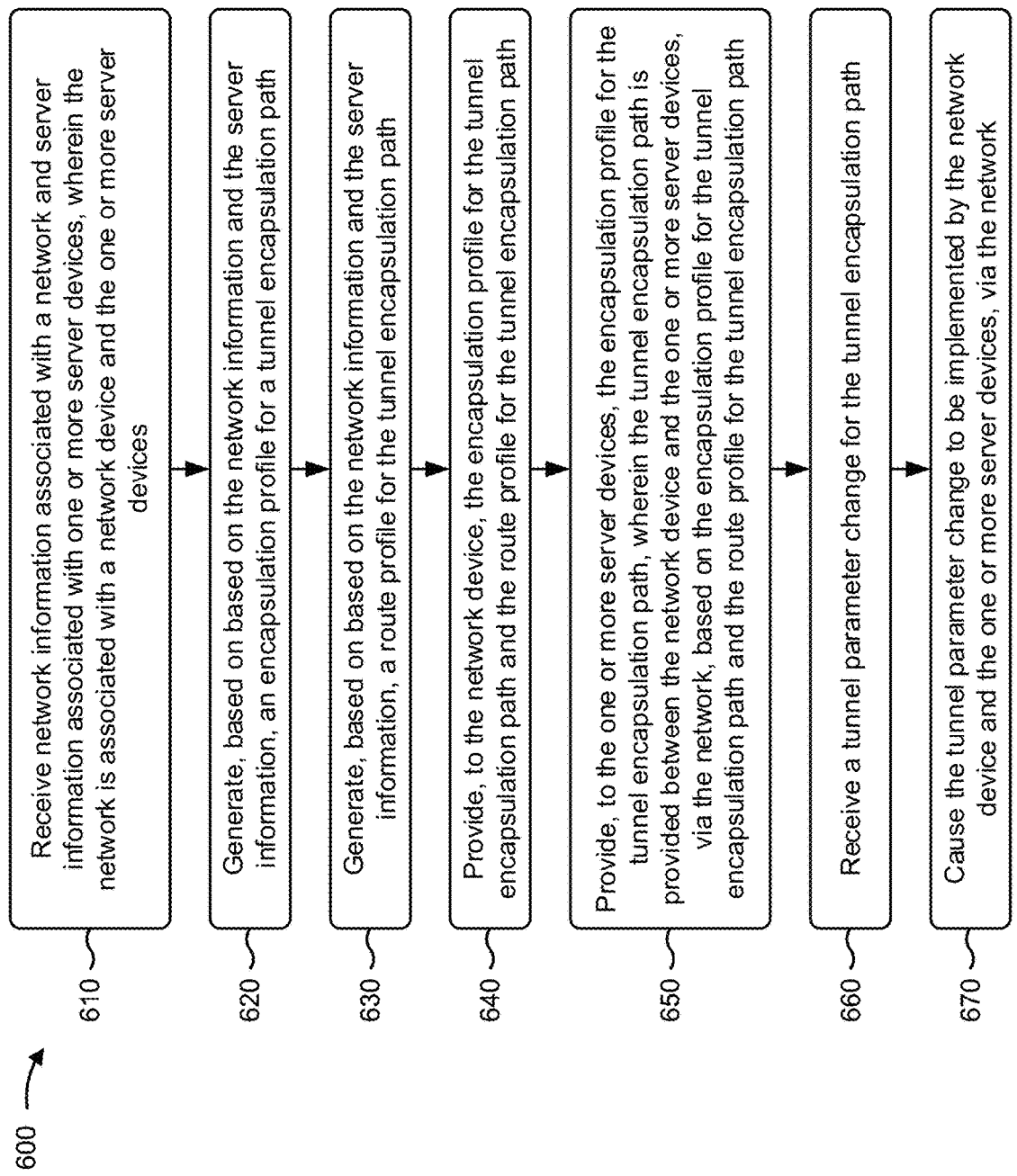

GENERATING FLEXIBLE, PROGRAMMABLE, AND SCALABLE NETWORK TUNNELS ON DEMAND

BACKGROUND

A network tunnel is a mechanism for secure transmission of private information through a public network in such a way that network devices of the public network are unaware of the private information. A tunneling protocol is a communications protocol that enables creation of a network tunnel. The tunneling protocol enables private information to be sent across a public network through a process called encapsulation.

SUMMARY

According to some implementations, a method may include receiving network information associated with a network and server information associated with one or more server devices, wherein the network may be associated with a network device and the one or more server devices. The method may include generating, based on the network information and the server information, an encapsulation profile for a tunnel encapsulation path, and generating, based on the network information and the server information, a route profile for the tunnel encapsulation path. The method may include providing, to the network device, the encapsulation profile for the tunnel encapsulation path and the route profile for the tunnel encapsulation path, and providing, to the one or more server devices, the encapsulation profile for the tunnel encapsulation path. The tunnel encapsulation path may be provided between the network device and the one or more server devices, via the network, based on the encapsulation profile for the tunnel encapsulation path and the route profile for the tunnel encapsulation path.

According to some implementations, a device may include one or more memories, and one or more processors to receive network information associated with a network and server information associated with one or more server devices, wherein the network may be associated with a network device and the one or more server devices. The one or more processors may generate an encapsulation profile for a tunnel encapsulation path based on the network information and the server information, and may generate a route profile for the tunnel encapsulation path based on the network information and the server information. The one or more processors may generate a decapsulation profile for a tunnel decapsulation path based on the network information and the server information, and may provide, to the network device, the encapsulation profile for the tunnel encapsulation path, the route profile for the tunnel encapsulation path, and the decapsulation profile for the tunnel decapsulation path. The one or more processors may provide, to the one or more server devices, the encapsulation profile for the tunnel encapsulation path and the decapsulation profile for the tunnel decapsulation path. The tunnel encapsulation path and the tunnel decapsulation path may be provided between the network device and the one or more server devices, via the network, based on the encapsulation profile for the tunnel encapsulation path and the route profile for the tunnel encapsulation path. The tunnel decapsulation path may be provided between the network device and the one or more server devices, via the network, based on the decapsulation profile for the tunnel decapsulation path.

According to some implementations, a non-transitory computer-readable medium may store instructions that include one or more instructions that, when executed by one or more processors of a device, cause the one or more processors to receive network information associated with a network and server information associated with one or more server devices, wherein the network is associated with a network device and the one or more server devices. The one or more instructions may cause the one or more processors to generate, based on the network information and the server information, an encapsulation profile for a tunnel encapsulation path, and generate, based on the network information and the server information, a route profile for the tunnel encapsulation path. The one or more instructions may cause the one or more processors to provide, to the network device, the encapsulation profile for the tunnel encapsulation path and the route profile for the tunnel encapsulation path, and provide, to the one or more server devices, the encapsulation profile for the tunnel encapsulation path. The tunnel encapsulation path may be provided between the network device and the one or more server devices, via the network, based on the encapsulation profile for the tunnel encapsulation path and the route profile for the tunnel encapsulation path. The one or more instructions may cause the one or more processors to receive a tunnel parameter change for the tunnel encapsulation path, and cause the tunnel parameter change to be implemented by the network device and the one or more server devices, via the network.

BRIEF DESCRIPTION OF THE DRAWINGS

FIGS. 4-6 are flow charts of example processes for generating flexible, programmable, and scalable network tunnels on demand.

DETAILED DESCRIPTION

Figure 1A:
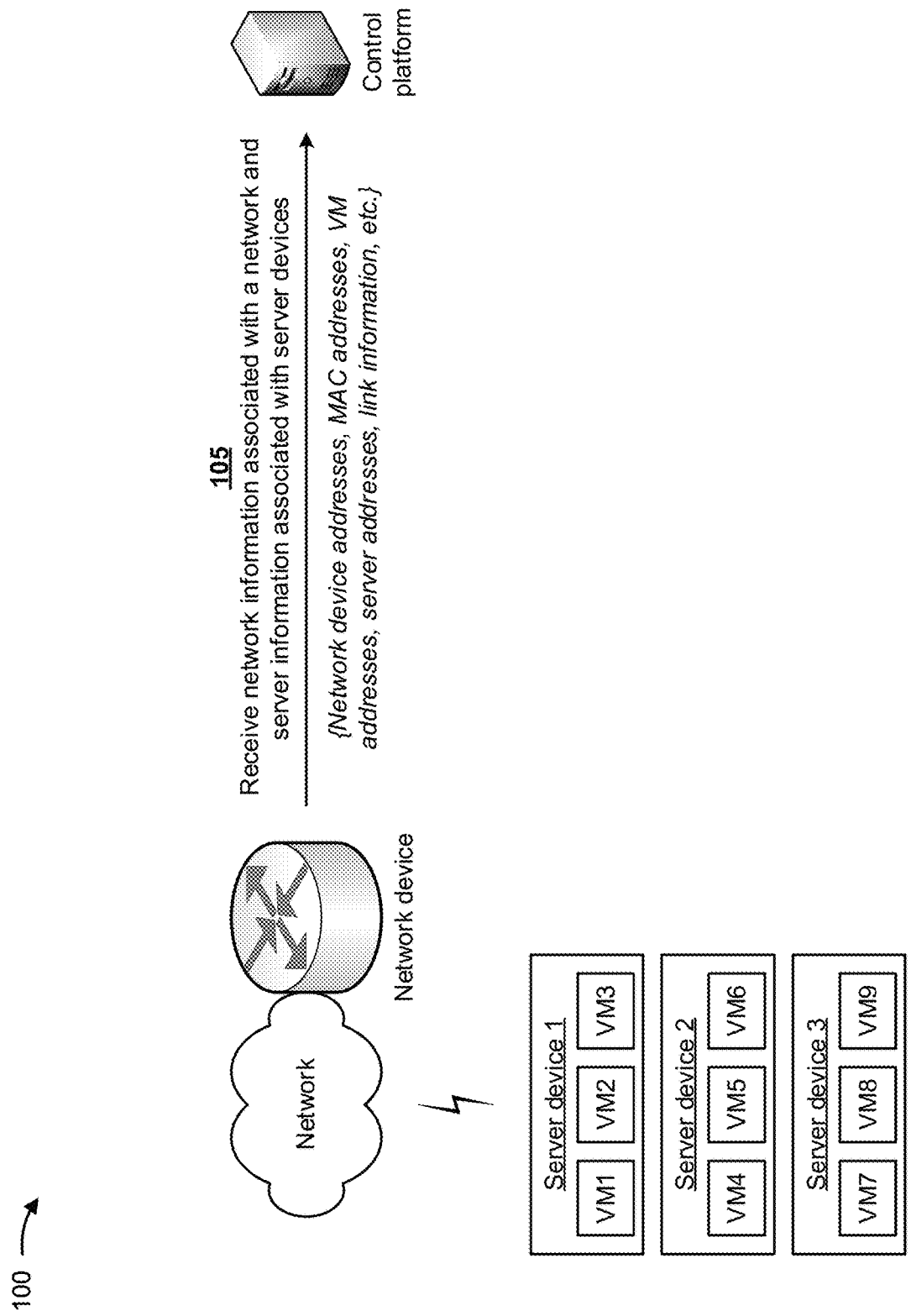
FIGS. 1A-1K are diagrams of an example implementation described herein.

The following detailed description of example implementations refers to the accompanying drawings. The same reference numbers in different drawings may identify the same or similar elements.

Tunnels are statically configured on network devices or are dynamically established through protocol learning. Such configuration methods are bound to configurations of the network devices or protocol mechanics, require maintenance of extensive states in the network devices, and involve long implementation cycles. Setting up a tunnel is time-consuming, control protocol dependent, and resource intensive. Any change in a tunnel parameter may be catastrophic and may cause significant packet loss until the changed tunnel is operational and routes are updated. Furthermore, tunnel parameters are fixed, lack fine-tune control, and are bound to protocol mechanics.

Some implementations described herein provide a control platform that generates flexible, programmable, and scalable network tunnels on demand. For example, the control platform may receive network information associated with a network and server information associated with one or more server devices, wherein the network may be associated with a network device and the one or more server devices. The control platform may generate, based on the network information and the server information, an encapsulation profile for a tunnel encapsulation path, and may generate, based on the network information and the server information, a route profile for the tunnel encapsulation path. The control platform may provide, to the network device, the encapsulation profile for the tunnel encapsulation path and the route profile for the tunnel encapsulation path, and may provide, to the one or more server devices, the encapsulation profile for the tunnel encapsulation path. The tunnel encapsulation path may be provided between the network device and the one or more server devices, via the network, based on the encapsulation profile for the tunnel encapsulation path and the route profile for the tunnel encapsulation path.

In this way, the control platform may provide programmable tunnels immediately (e.g., on-the-fly) via a simple, flexible, and extensible application programming interface (API). The API enables the control platform to program the tunnels and associate the tunnels with a route prefix in any routing instance. A tunnel type may be any Internet protocol (IP) tunnel and tunnel parameters may be set to various values. Individual tunnel parameter objects may be applied to tunnel encapsulation, tunnel decapsulation, symmetric tunnel encapsulation and decapsulation, and/or the like.

The control platform may provide tunnels that are extensible to accommodate new types of tunnels. This may enable migration of new services with ease, may aid with backward compatibility with older applications or services, and may provide faster deployments with less control states in the network. The control platform may change tunnel parameters while the tunnel is in use and without losing tunnel traffic, unlike existing tunnel implementations that are subject to static tunnel settings, software life-cycles, standards, protocol modifications, and/or the like.

Unlike typical tunnels, tunnels created by the control platform may be asymmetric or unidirectional. For example, the control platform may program a tunnel to only encapsulate traffic, to only decapsulate traffic, or to encapsulate and decapsulate traffic. The control platform also enables multiple decapsulation tunnels (e.g., from a same subnet) to be aggregated, which conserves resources (e.g., processing resources, memory resources, and/or the like). The control platform creates tunnels that are highly scalable because of efficient utilization of network resources and the absence of persistent configuration of network devices. A tunnel configuration, generated by the control platform, includes a light-weight encapsulation string without constructs, such as next hops, tunnel interfaces, and/or the like.

The control platform also enables provision of features (e.g., accounting, security, mirroring, sampling, and/or the like) to be applied to traffic in encapsulation tunnels and decapsulation tunnels. Such features may provide visibility and diagnostics for the traffic in the tunnels. The control platform provides tunnels through which traffic is forwarded efficiently in one pass, without having to have the traffic loop back via network devices. In this way, the control platform provides increased tunnel forwarding performance, by increasing tunnel throughput and reducing tunnel latency.

FIGS. 1A-1K are diagrams of an example implementation 100 described herein. As shown in FIG. 1A, a network (e.g., a public network) may be associated with a control platform. As further shown in FIG. 1A, the network may include a network device and be associated with multiple server devices (e.g., server device 1, server device 2, and server device 3). Each server device may include multiple virtual machines (VMs), such as VM1, VM2, and VM3 provided in server device 1, VM4, VM5, and VM6 provided in server device 2, and VM7, VM8, and VM9 provided in server device 3. In some implementations, the server devices may form a data center environment, a cloud-computing environment, and/or the like, and the network device may communicate with the server devices via the network. In such implementations, an end user device may access services provided by the server devices via the network device and the network.

As further shown in FIG. 1A, and by reference number 105, the control platform may receive, from the network device, network information associated with the network and server information associated with the server devices. In some implementations, the network information may include information indicating addresses of network devices of the network, media access control (MAC) addresses of the network devices, Internet protocol (IP) addresses of the network devices, serial numbers of the network devices, manufacturers of the network devices, makes and/or models of the network devices, types of links provided between the network devices, types of links provided in the network, and/or the like. In some implementations, the server information may include information indicating MAC addresses of the server devices, IP addresses of the server devices, serial numbers of the server devices, manufacturers of the server devices, makes and/or models of the server devices, types of links provided between the server devices, addresses of the VMs, and/or the like.

Figure 1B:
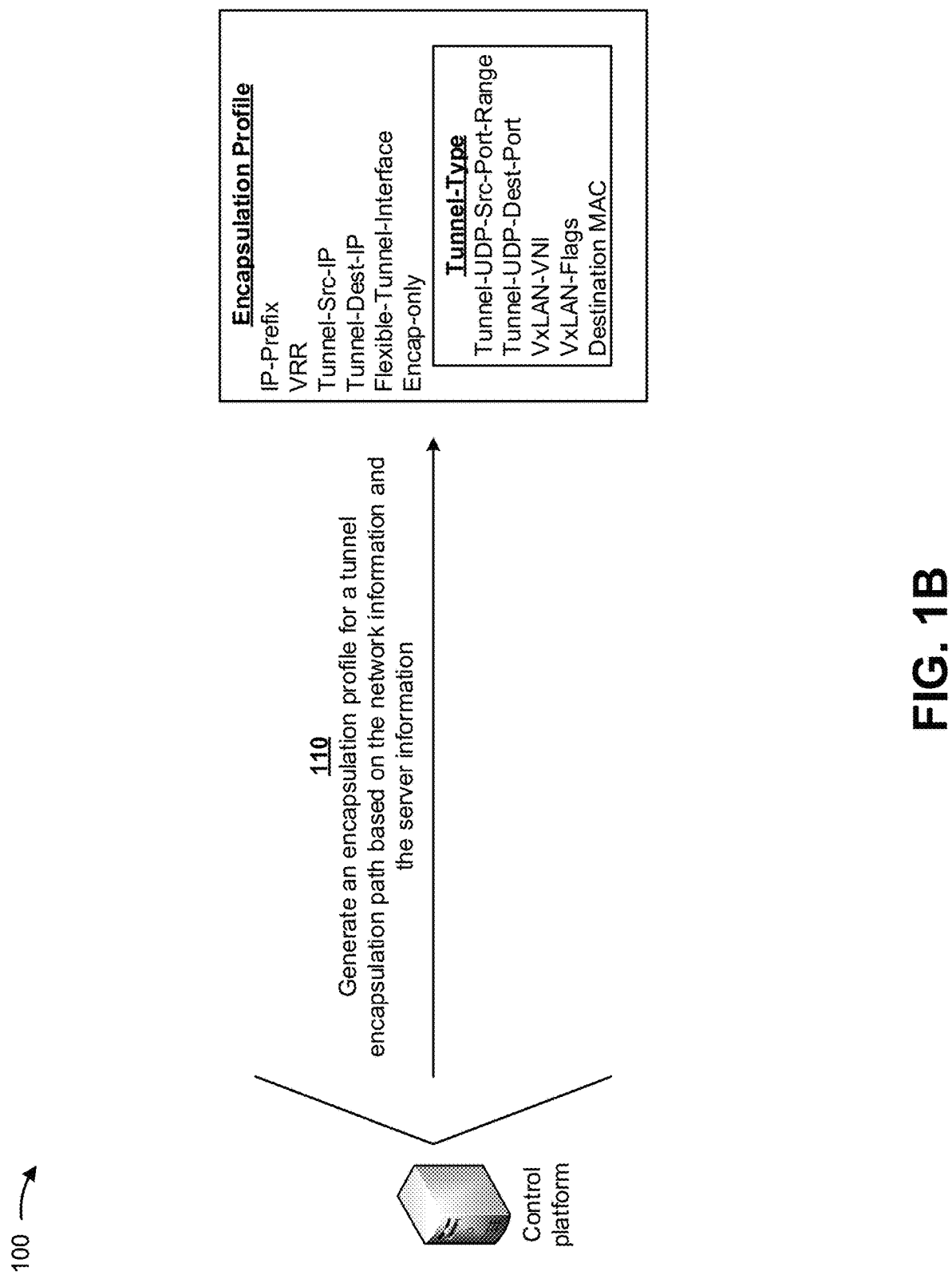

As shown in FIG. 1B, and by reference number 110, the control platform may generate an encapsulation profile for a tunnel encapsulation path based on the network information and the server information. In some implementations, the control platform may utilize the network information and the server information to identify a path from the network device, through the network, and to a server device (e.g., a VM of a server device). The control platform may generate the encapsulation profile based on the identified path. In some implementations, the control platform may process the network information and the server information, with a machine learning model, to identify the path from the network device, through the network, and to the server device.

In some implementations, the control platform may perform a training operation on the machine learning model with historical network information, server information, and/or path information. For example, the control platform may separate the historical network information, server information, and/or path information into a training set, a validation set, a test set, and/or the like. In some implementations, the control platform may train the machine learning model using, for example, an unsupervised training procedure and based on the training set of the historical network information, server information, and path information. For example, the control platform may perform dimensionality reduction to reduce the historical network information, server information, and/or path information to a minimum feature set, thereby reducing resources (e.g., processing resources, memory resources, and/or the like) to train the machine learning model, and may apply a classification technique, to the minimum feature set.

In some implementations, the control platform may use a logistic regression classification technique to determine a categorical outcome (e.g., that the historical network information and server information resulted in identification of particular paths). Additionally, or alternatively, the control platform may use a naïve Bayesian classifier technique. In this case, the control platform may perform binary recursive partitioning to split the historical network information, server information, and/or path information into partitions and/or branches, and use the partitions and/or branches to perform predictions (e.g., that the historical network information and server information resulted in identification of particular paths). Based on using recursive partitioning, the control platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the control platform may use a support vector machine (SVM) classifier technique to generate a non-linear boundary between data points in the training set. In this case, the non-linear boundary is used to classify test data into a particular class.

Additionally, or alternatively, the control platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the control platform may use one or more other model training techniques, such as a neural network technique, a latent semantic indexing technique, and/or the like. For example, the control platform may perform an artificial neural network processing technique (e.g., using a two-layer feedforward neural network architecture, a three-layer feedforward neural network architecture, and/or the like) to perform pattern recognition with regard to optimal regions of the historical network information, server information, and path information. In this case, using the artificial neural network processing technique may improve an accuracy of the trained machine learning model generated by the control platform by being more robust to noisy, imprecise, or incomplete data, and by enabling the control platform to detect patterns and/or trends undetectable to human analysts or systems using less complex techniques.

In some implementations, the encapsulation associated with the tunnel encapsulation path may include a virtual extensible local area network (VxLAN) (e.g., which may be identified by a VxLAN network identifier or a VNI) encapsulation, a VxLAN generic protocol extension (VxLAN-GPE) encapsulation, a generic routing encapsulation (GRE), a generic network virtualization encapsulation (GENEVE), a segment routing version 6 (SRv6) encapsulation, and/or the like. In some implementations, the control platform may change the encapsulation via the encapsulation profile, which enables encapsulation control at a route level.

In some implementations, the encapsulation profile may include an application programming interface (API), such as an OpenFlow API, an advanced forwarding toolkit (AFT) API, and/or the like. As further shown in FIG. 1B, in some implementations, the encapsulation profile may include information indicating an IP prefix of the tunnel encapsulation path, that virtual routing and forwarding (VRF) is enabled for the tunnel encapsulation path, a source IP address of the tunnel encapsulation path (Tunnel-Src-IP), a destination IP address of the tunnel encapsulation path (Tunnel-Dest-IP), a flexible tunnel interface for the tunnel encapsulation path, that the tunnel encapsulation path is for encapsulation only (Encap-only), a user datagram protocol (UDP) source port range for the tunnel encapsulation path (Tunnel-UDP-Src-Port-Range), a UDP destination port for the tunnel encapsulation path (Tunnel-UDP-Dest-Port), an encapsulation associated with the tunnel encapsulation path (VxLAN-VNI), flags associated with the encapsulation (e.g., VxLAN-Flags), a destination MAC address of the tunnel encapsulation path, and/or the like.

In some implementations, the encapsulation profile may include VXLAN reserved bits to pass forwarding context for remote endpoint devices (e.g., the server devices) and intermediate network devices of the network. For example, the VXLAN reserved bits may indicate that traffic statistics are to be collected, that packet mirroring is required, a type of originating end-point device (e.g., the network device), which may be used by a remote endpoint device to process traffic differently, and/or the like.

In some implementations, the encapsulation profile may include a network services function header that enables selection of a service chain to be followed by a packet. In some implementations, the encapsulation profile may include SRv6 segment header (e.g., with an IPv6 segment list) that indicates a path through service functions, enables dynamic addition and/or removal of services, manipulates service endpoint devices, and/or the like.

In some implementations, the tunnel destination IP address may enable changing the tunnel destination IP address on-the-fly so that services may be seamlessly moved across server devices. In some implementations, the encapsulation profile may include information indicating a VxLAN-UDP source port and/or an IP-UDP source port, which enables specification of a range of source-ports per tunnel and selection of a port in the range using a hash value derived from a payload of a packet.

In some implementations, the encapsulation profile may include information indicating a VXLAN-UDP destination port, which enables selection of UDP destination ports to multiplex various tunnel types in the network. In some implementations, the VxLAN-VNI may enable seamless migration from one domain (e.g., server device or VM) to another domain (e.g., another server device or VM).

Figure 1C:

As shown in FIG. 1C, and by reference number 115, the control platform may provide the encapsulation profile for the tunnel encapsulation path to the network device. The network device may receive the encapsulation profile and may utilize the encapsulation profile to establish the tunnel encapsulation path from the network device, through the network, and to one of the server devices and/or VMs, as described below.

Figure 1D:
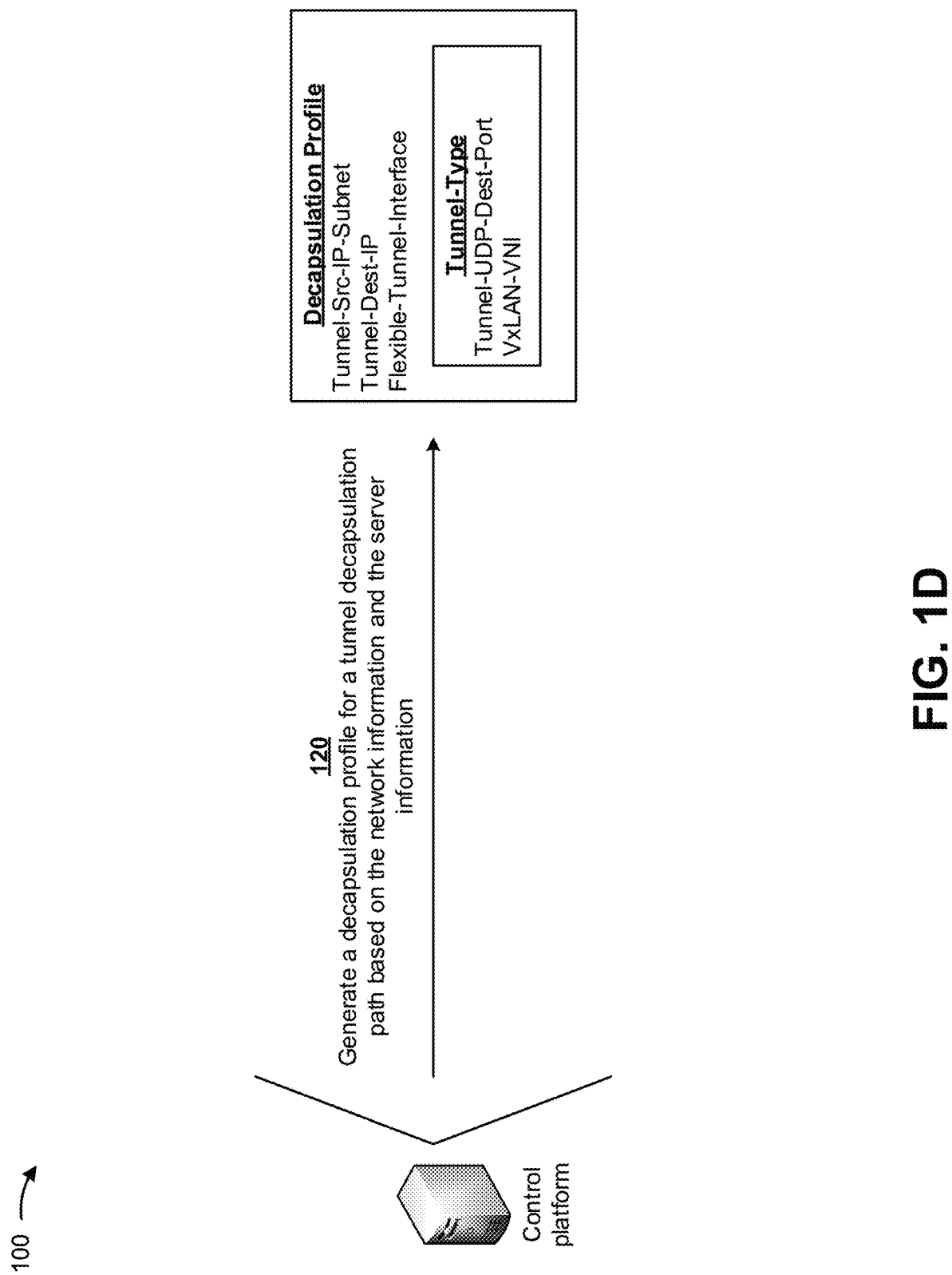

As shown in FIG. 1D, and by reference number 120, the control platform may generate a decapsulation profile for a tunnel decapsulation path based on the network information and the server information. In some implementations, the control platform may utilize the network information and the server information to identify a path from the network device, through the network, and to one of the server devices (e.g., to one of the VMs). The control platform may generate the decapsulation profile based on the identified path. In some implementations, the control platform may process the network information and the server information, with a machine learning model, to identify the path from the network device, through the network, and to the server device, as described above in connection with FIG. 1B.

In some implementations, the decapsulation profile may include an API, such as an OpenFlow API, an AFT API, and/or the like. As further shown in FIG. 1D, in some implementations, the decapsulation profile may include information indicating a source IP-subnet address of the tunnel decapsulation path (Tunnel-Src-IP-Subnet), a destination IP address of the tunnel decapsulation path (Tunnel-Dest-IP), a flexible tunnel interface for the tunnel decapsulation path, a UDP destination port for the tunnel decapsulation path (Tunnel-UDP-Dest-Port), a decapsulation associated with the tunnel decapsulation path (VxLAN-VNI), and/or the like.

Figure 1E:
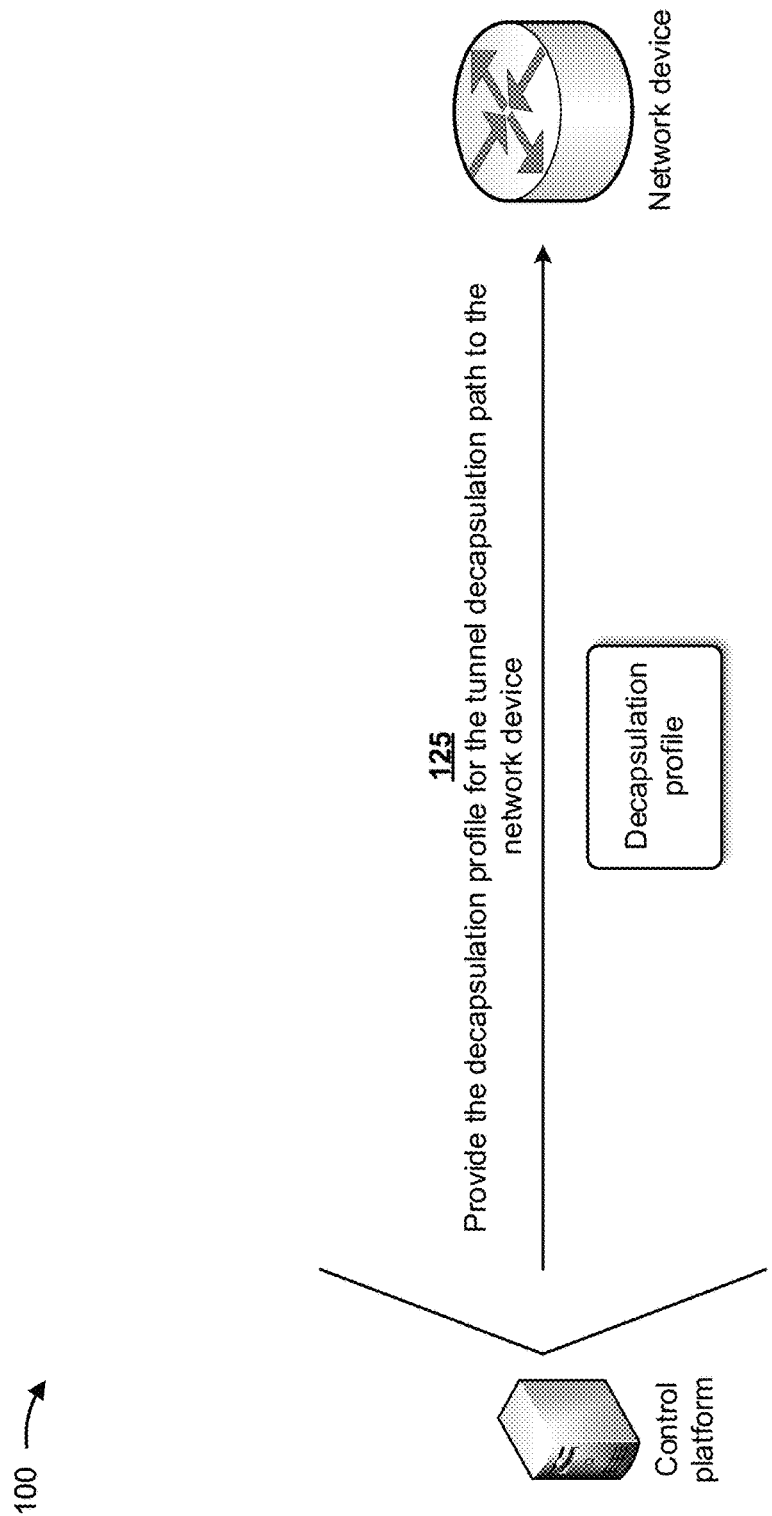

As shown in FIG. 1E, and by reference number 125, the control platform may provide the decapsulation profile for the tunnel decapsulation path to the network device. The network device may receive the decapsulation profile and may utilize the decapsulation profile to establish the tunnel decapsulation path from the network device, through the network, and to one of the server devices and/or VMs, as described below.

Figure 1F:
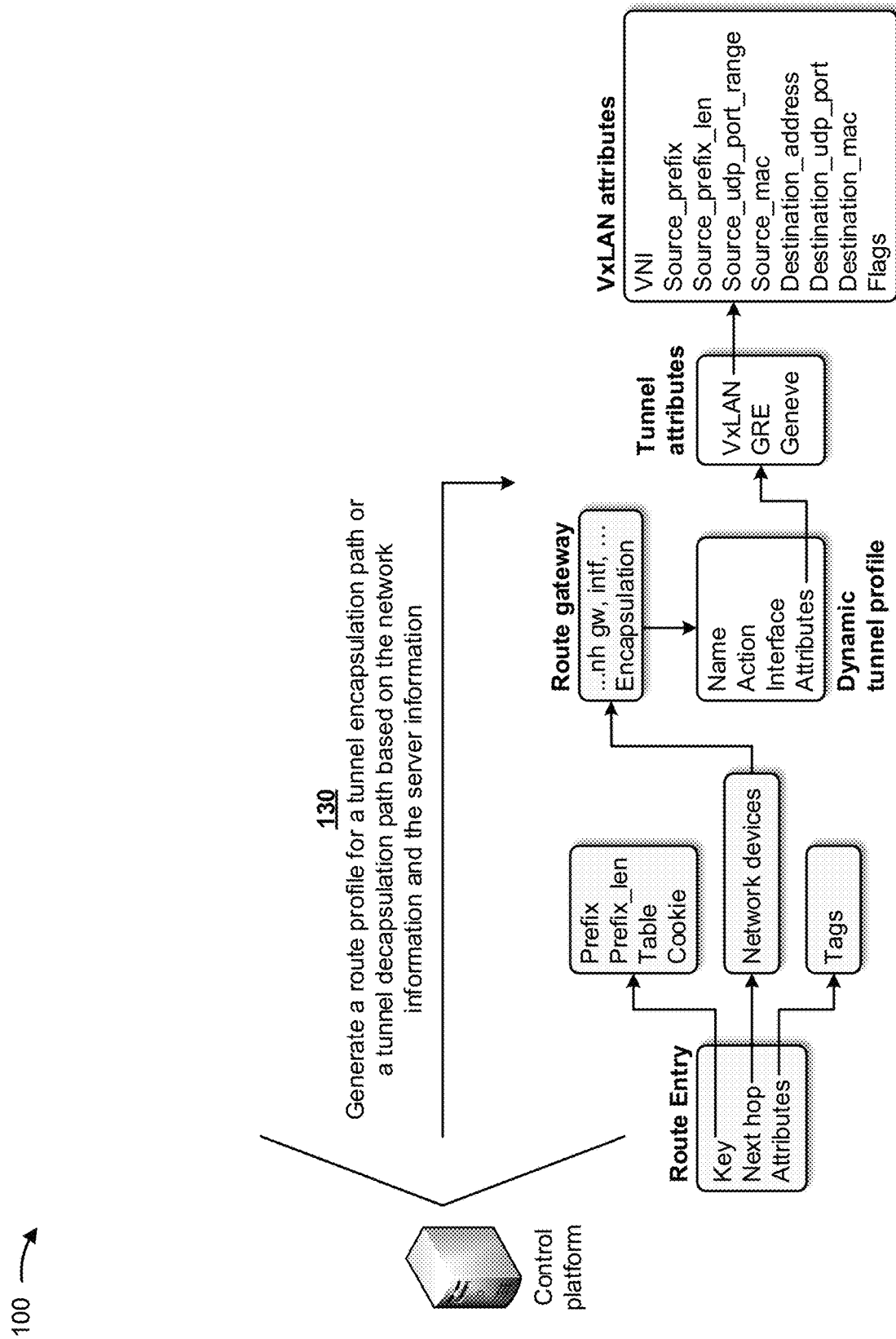

As shown in FIG. 1F, and by reference number 130, the control platform may generate a route profile for the tunnel encapsulation path or the tunnel decapsulation path based on the network information and the server information. In some implementations, the control platform may utilize the network information and the server information to identify a route from the network device, through the network, and to one of the server devices (e.g., to one of the VMs). The control platform may generate the route profile based on the identified route. In some implementations, the control platform may process the network information and the server information, with a machine learning model, to identify the route from the network device, through the network, and to the server device, as described above in connection with FIG. 1B.

In some implementations, the route profile may include an API, such as an OpenFlow API, an AFT API, and/or the like. As further shown in FIG. 1F, in some implementations, the route profile may include information indicating route entry for the route, such as key, a next hop, attributes, and/or the like associated with the route. In some implementations, the key may include information indicating a prefix of the key, a prefix length (Prefix_len) of the key, a table associated with the key, a cookie associated with the key, and/or the like. In some implementations, the next hop may include information indicating network devices, of the network, that are to be associated with the route. In some implementations, the attributes may include information indicating tags associated with the route. In some implementations, one of the network devices to be associated with the route may include a route gateway that provides encapsulation.

In some implementations, the route profile may be associated with the encapsulation profile or the decapsulation profile (e.g., referred to in FIG. 1F as a dynamic tunnel profile), depending on the type of tunnel to be defined by the control platform. As shown, in some implementations, the dynamic tunnel profile may include information indicating a name of the dynamic tunnel profile, an action to be taken by the dynamic tunnel profile, an interface associated with the dynamic tunnel profile, attributes associated with the tunnel, and/or the like. In some implementations, the tunnel attributes may include information indicating an encapsulation associated with the tunnel, such as VxLAN, GRE, GENEVE, and/or the like. In some implementations, attributes associated with the VxLAN may include information indicating a VNI associated with the tunnel, a source prefix associated with the tunnel, a source prefix length associated with the tunnel, a source UDP port range associated with the tunnel, a source MAC address associated with the tunnel, a destination address associated with the tunnel, a destination UDP port associated with the tunnel, a destination MAC address associated with the tunnel, flags associated with the tunnel, and/or the like.

Figure 1G:
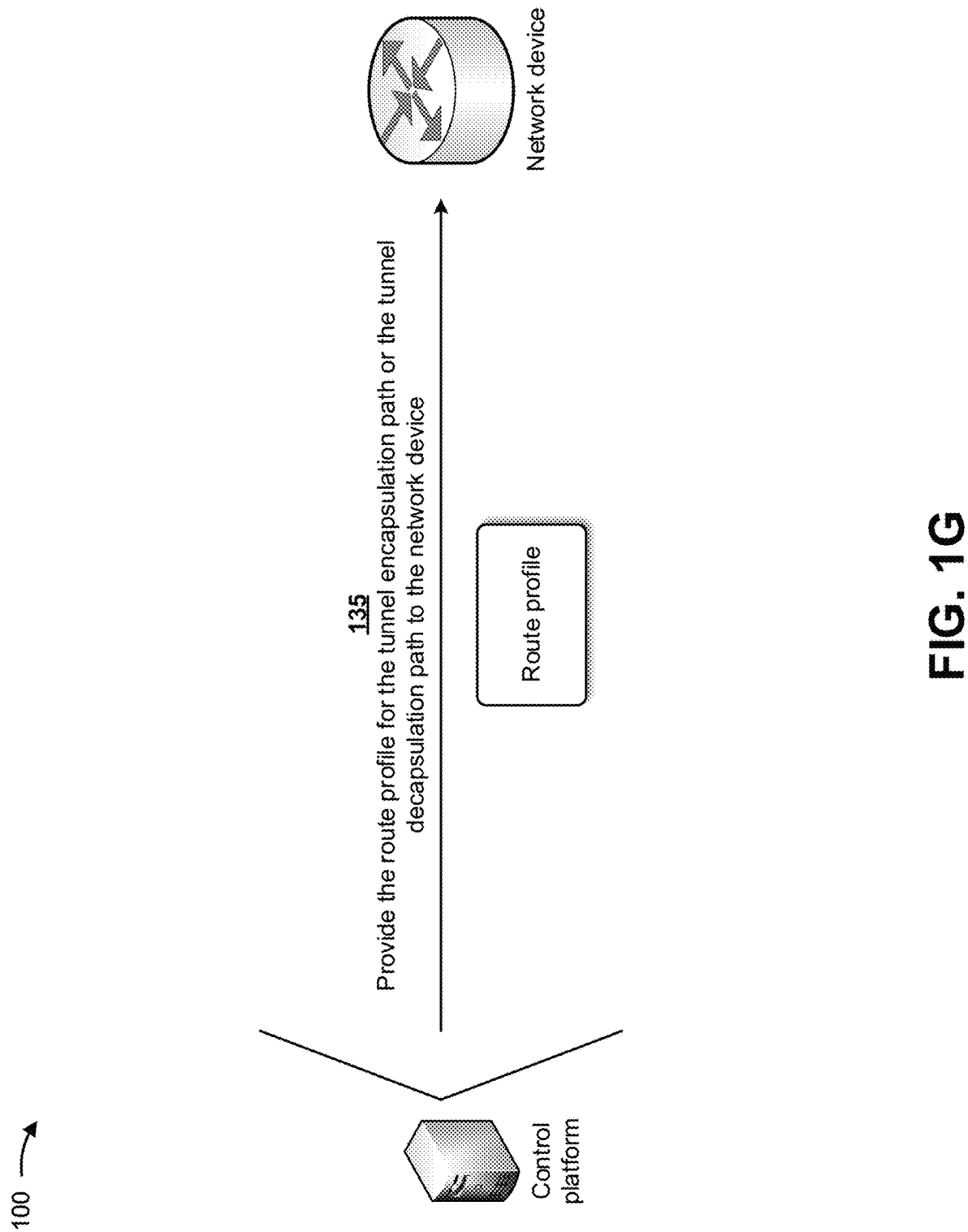

As shown in FIG. 1G, and by reference number 135, the control platform may provide the route profile for the tunnel decapsulation path. The network device may receive the route profile and may utilize the route profile to establish the tunnel decapsulation path from the network device, through the network, and to one of the server devices and/or VMs, as described below.

Figure 1H:
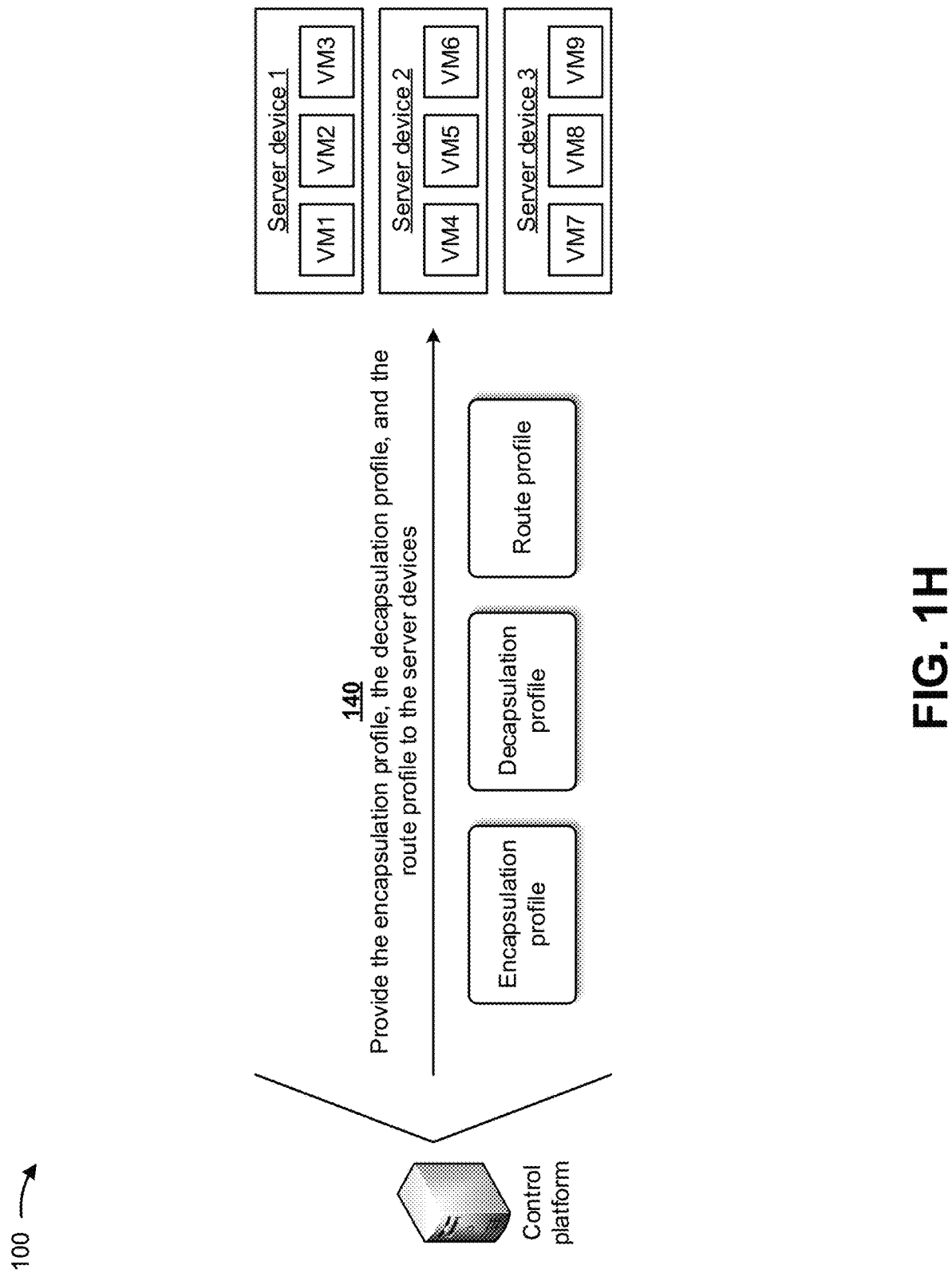

As shown in FIG. 1H, and by reference number 140, the control platform may provide the encapsulation profile, the decapsulation profile, and the route profile to the server devices. The server devices may receive the encapsulation profile, the decapsulation profile, and the route profile and may utilize the encapsulation profile, the decapsulation profile, and the route profile to establish the tunnel encapsulation path and/or the tunnel decapsulation path from the network device, through the network, and to one of the server devices and/or VMs, as described below.

Figure 1I:
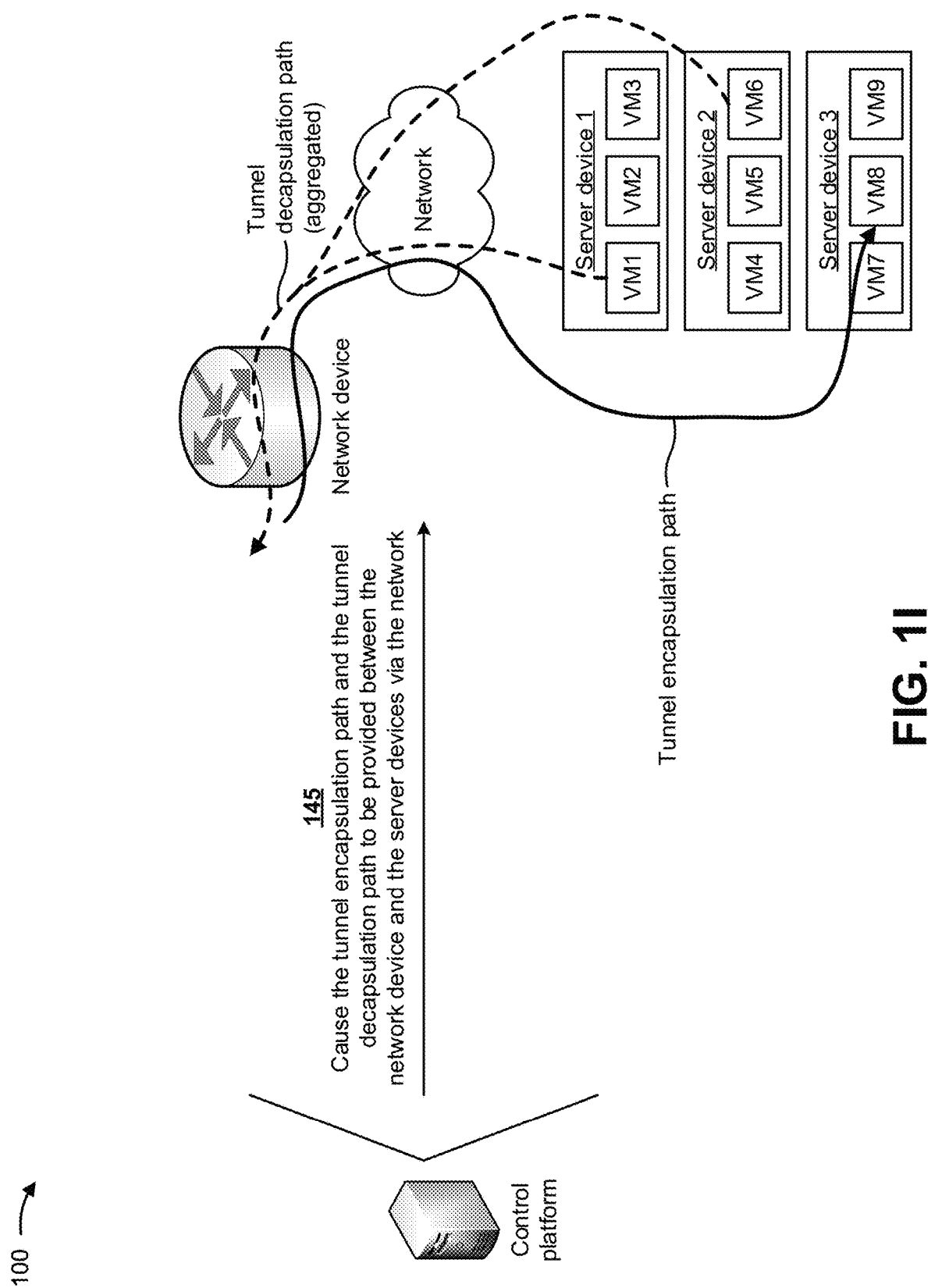

As shown in FIG. 1I, and by reference number 145, the control platform may cause the tunnel encapsulation path and the tunnel decapsulation path to be provided between the network device and the server devices via the network. In some implementations, the control platform may provide, to the network device and/or the server devices, an instruction that instructs the network device and/or the server devices to establish the tunnel encapsulation path and the tunnel decapsulation path between the network device and the server devices via the network. In some implementations, provision of the encapsulation profile, the decapsulation profile, and the route profile to the network device and the server devices may automatically cause the network device and/or the server devices to establish the tunnel encapsulation path and the tunnel decapsulation path between the network device and the server devices via the network.

As further shown in FIG. 1I and by way of example, based on the encapsulation profile and the route profile, the tunnel encapsulation path may be established between the network device and VM8 of server device 3. In this way, the tunnel encapsulation path may enable an end user device to securely access a service provided by VM8 via the public network.

As further shown in FIG. 1I, based on the decapsulation profile and the route profile, an aggregated tunnel decapsulation path may be established between the network device and VM1 of server device 1 and between the network device and VM6 of server device 2. In this way, the tunnel decapsulation path may enable an end user device to securely receive services provided by VM1 and VM6 via the public network. In some implementations, the control platform may generate a first decapsulation profile for a first tunnel decapsulation path (e.g., associated with VM1) based on the network information and the server information, and may generate a second decapsulation profile for a second tunnel decapsulation path (e.g., associated with VM6) based on the network information and the server information. In such implementations, the control platform may aggregate the first decapsulation profile and the second decapsulation profile to generate an aggregated decapsulation profile for an aggregated tunnel decapsulation path. The aggregated tunnel decapsulation path may combine the first tunnel decapsulation path and the second tunnel decapsulation path. The control platform may provide the aggregated decapsulation profile for the aggregated tunnel decapsulation path to the network device and the server devices. In some implementations, the control platform may aggregate more than two decapsulation profiles and more than two tunnel decapsulation paths.

Figure 1J:
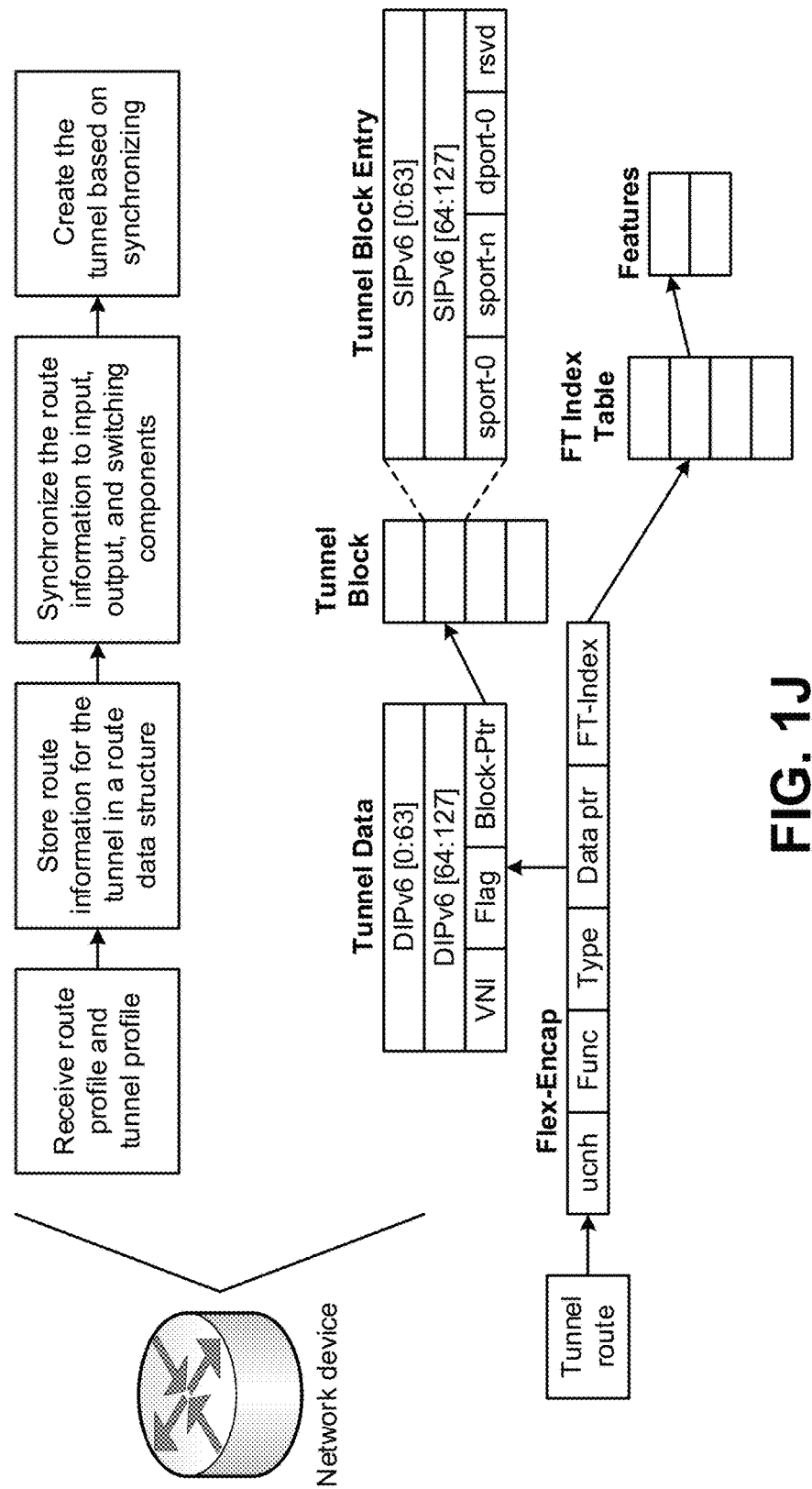

As shown in an upper portion of FIG. 1J, the network device may receive the route profile and the tunnel profile (e.g., either the encapsulation profile or the decapsulation profile), and may store route information for the tunnel in a data structure (e.g., a database, a table, a list, and/or the like). The network device may synchronize the route information to input components, output components, and switching components of the network device, and may create the tunnel (e.g., between the network device and the server devices, via the network) based on synchronizing the route information to the input components, the output components, and the switching components of the network device.

As shown in a lower portion of FIG. 1J, the route information may include information indicating the tunnel route, a flexible encapsulation header for the tunnel, tunnel data, a tunnel block, a tunnel block entry, a feature tunnel (FT) index table, features, and/or the like. The tunnel route may include information indicating IP address information associated with the tunnel. The flexible encapsulation header may include information indicating a network header (ucnh) associated with the tunnel, a function associated with the tunnel, a type associated with the tunnel (e.g., encapsulation or decapsulation), a pointer to the tunnel data, and a pointer to the FT index table. The tunnel data may include information indicating a first set of discovery initiation protocol (DIPv6) bits ([0:63]), a second set of DIPv6 bits ([64;127]), a VNI associated with the tunnel, a flag associated with the tunnel, and a pointer to the tunnel block. The tunnel block includes a block of tunnel block entries, wherein each tunnel block entry may include information indicating a first set of session initiation protocol (SIPv6) bits ([0:63]), a second set of SIPv6 bits ([64;127]), a source port range (sport-0 to sport-n) associated with the tunnel, and a destination port (dport-0) associated with the tunnel. The FT index table may include a table features to be implemented by the tunnel, such as security features, packet mirroring, accounting, and/or the like.

Figure 1K:
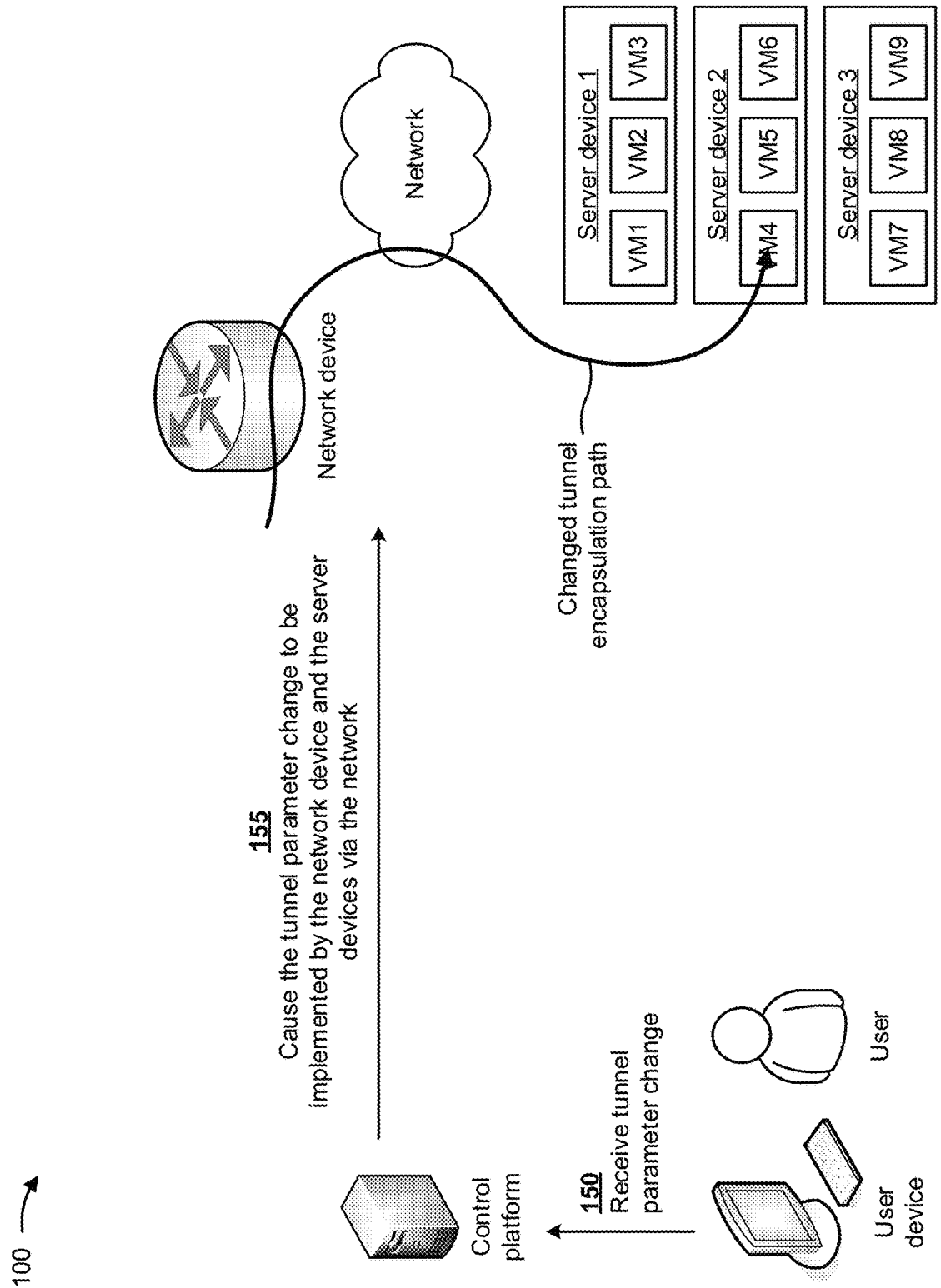

As shown in FIG. 1K, a user associated with a user device may cause the user device to provide, to the control platform, a tunnel parameter change request for the tunnel encapsulation path. For example, assume that the tunnel parameter change request indicates that the tunnel encapsulation path is to be changed so that the tunnel encapsulation path is provided between the network device and VM4 of server device 2 (e.g., rather than VM8 of server device 3, as shown in FIG. 1I). As indicated by reference number 150, the control platform may receive the tunnel parameter change request. As further shown in FIG. 1K, and by reference number 155, the control platform may cause the tunnel parameter change to be implemented by the network device and the server devices via the network. For example, the control platform may cause a changed tunnel encapsulation path to be established (e.g., on-the-fly) between the network device and VM4 of server device 2.

In some implementations, the control platform may process thousands, millions, billions or more encapsulation profiles, decapsulation profiles, and route profiles to be provided to hundreds, thousands, millions, or more network devices and/or server devices. In such implementations, the control platform may concurrently process tens, hundreds, thousands, or more encapsulation profiles, decapsulation profiles, and route profiles in a given time window.

In this way, several different stages of the process for generating flexible, programmable, and scalable network tunnels on demand may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to generate flexible, programmable, and scalable network tunnels on demand. Finally, automating the process for generating flexible, programmable, and scalable network tunnels on demand conserves computing resources (e.g., processor resources, memory resources, and/or the like) and/or network resources that would otherwise be wasted in attempting to generate tunnels.

As indicated above, FIGS. 1A-1K are provided merely as examples. Other examples are possible and may differ from what was described with regard to FIGS. 1A-1K.

Figure 2:
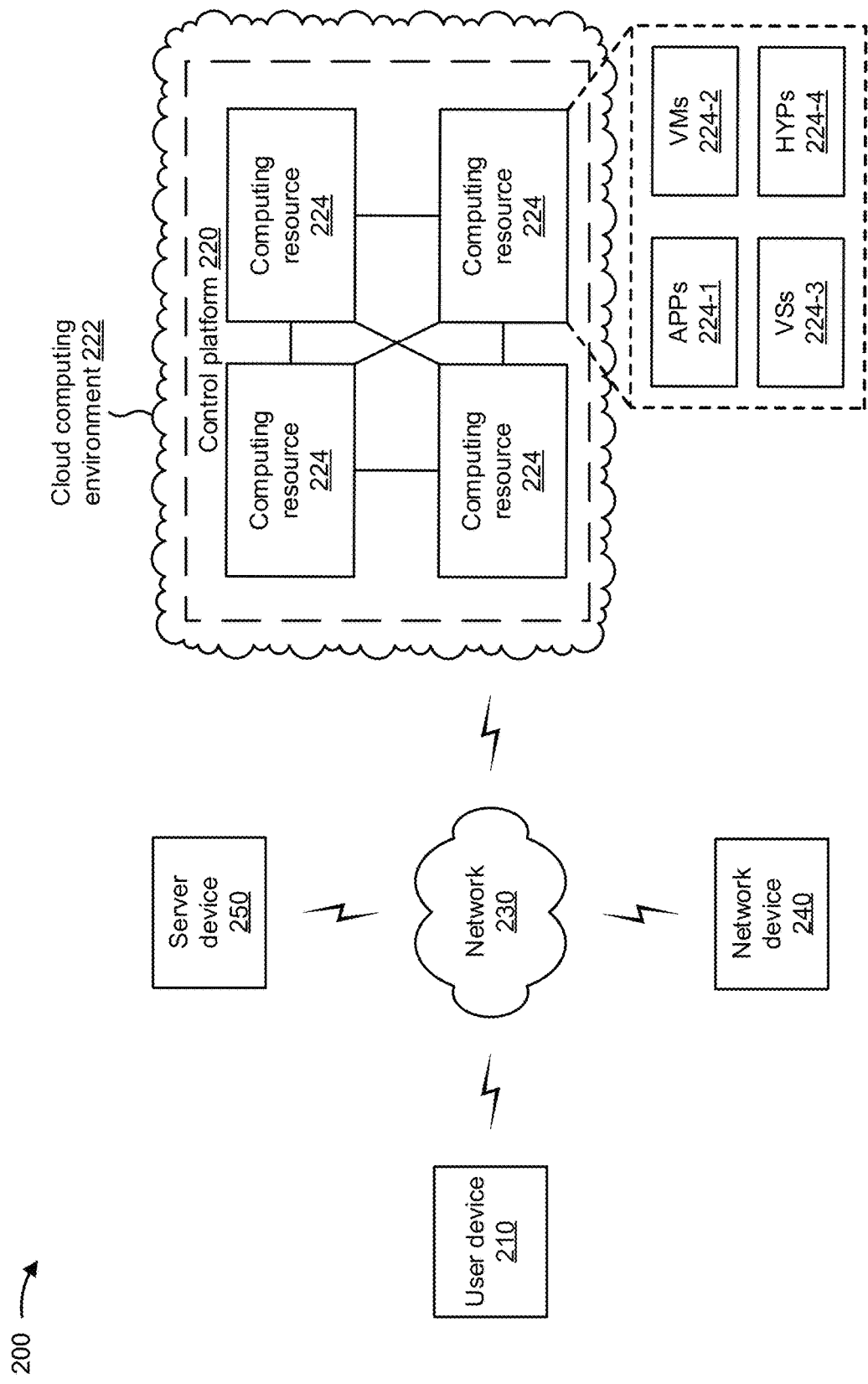
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a control platform 220, a network 230, a network device 240, and a server device 250. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to one or more other devices of environment 200.

Control platform 220 includes one or more devices that generate flexible, programmable, and scalable network tunnels on demand. In some implementations, control platform 220 may be designed to be modular such that certain software components may be swapped in or out depending on a particular need. As such, control platform 220 may be easily and/or quickly reconfigured for different uses. In some implementations, control platform 220 may receive information from and/or transmit information to one or more other devices of environment 200.

In some implementations, as shown, control platform 220 may be hosted in a cloud computing environment 222. Notably, while implementations described herein describe control platform 220 as being hosted in cloud computing environment 222, in some implementations, control platform 220 may not be cloud-based (i.e., may be implemented outside of a cloud computing environment, such as within one or more server devices) or may be partially cloud-based.

Cloud computing environment 222 includes an environment that hosts control platform 220. Cloud computing environment 222 may provide computation, software, data access, storage, etc. services that do not require end-user knowledge of a physical location and configuration of system(s) and/or device(s) that hosts control platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host control platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with control platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of control platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices (e.g., one or more traffic transfer devices) capable of receiving, providing, storing, generating, and/or processing information described herein. For example, network device 240 may include a firewall, a router, a policy enforcer, a gateway, a switch, a hub, a bridge, a reverse proxy, a server (e.g., a proxy server), a security device, an intrusion detection device, a load balancer, or a similar device. In some implementations, network device 240 may receive information from and/or provide information to one or more other devices of environment 200. In some implementations, network device 240 may be a physical device implemented within a housing, such as a chassis. In some implementations, network device 240 may be a virtual device implemented by one or more computer devices of a cloud computing environment or a data center.

Server device 250 includes one or more devices capable of receiving, generating storing, processing, and/or providing information described herein. For example, server device 250 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 250 may include a communication interface that allows server device 250 to receive information from and/or transmit information to other devices in environment 200. In some implementations, server device 250 may be a physical device implemented within a housing, such as a chassis. In some implementations, server device 250 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
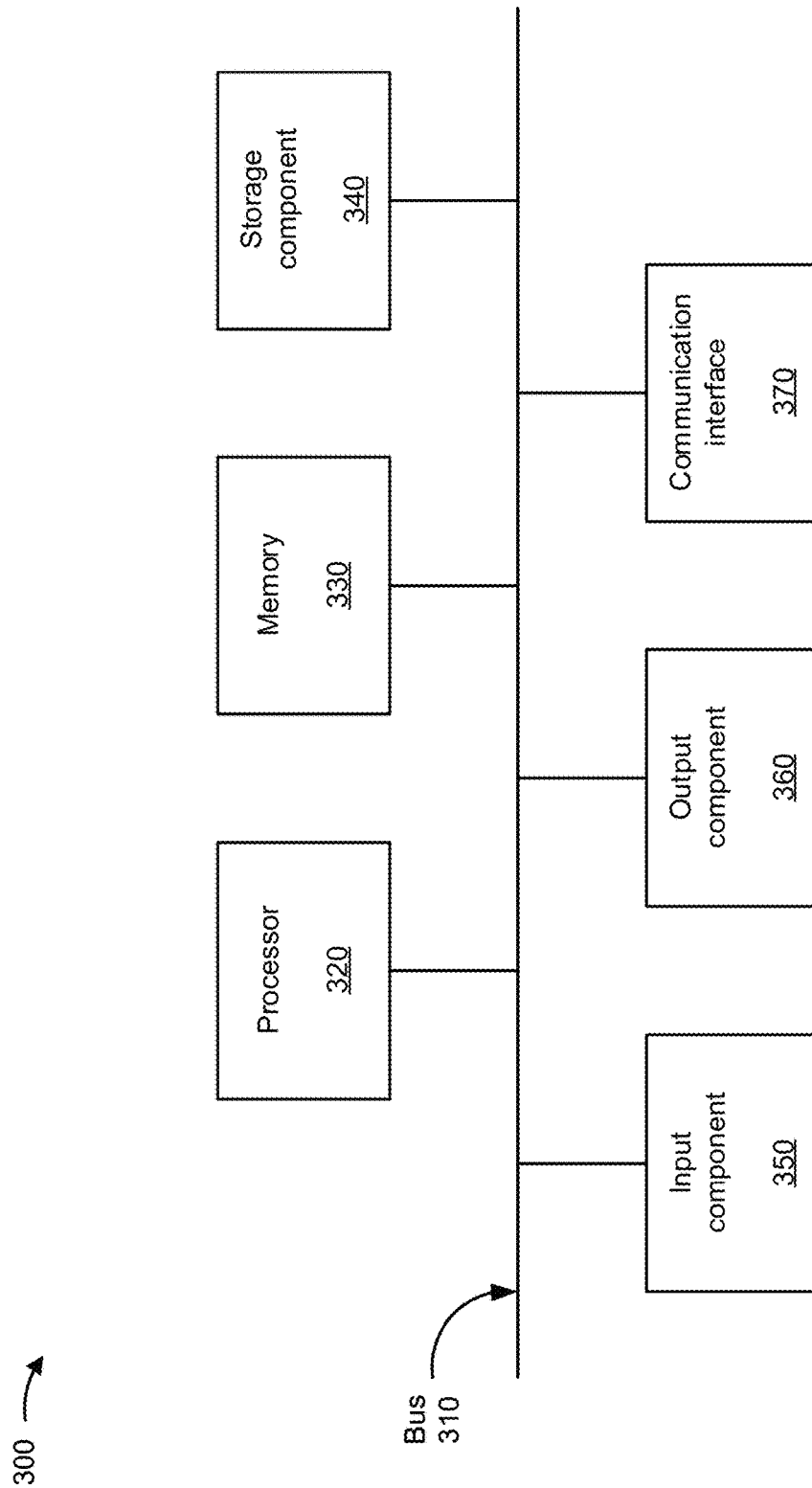
FIG. 3 is a diagram of example components of one or more devices of FIG. 2.

FIG. 3 is a diagram of example components of a device 300. Device 300 may correspond to user device 210, control platform 220, computing resource 224, network device 240, and/or server device 250. In some implementations, user device 210, control platform 220, computing resource 224, network device 240, and/or server device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating flexible, programmable, and scalable network tunnels on demand. In some implementations, one or more process blocks of FIG. 4 may be performed by a control platform (e.g., control platform 220). In some implementations, one or more process blocks of FIG. 4 may be performed by another device or a group of devices separate from or including the control platform, such as a user device (e.g., user device 210), a network device (e.g., network device 240), and/or a server device (e.g., server device 250).

As shown in FIG. 4, process 400 may include receiving network information associated with a network and server information associated with one or more server devices, wherein the network is associated with a network device and the one or more server devices (block 410). For example, the control platform (e.g., using computing resource 224, processor 320, communication interface 370, and/or the like) may receive network information associated with a network and server information associated with one or more server devices, as described above in connection with FIGS. 1A-2. In some implementations, the network may be associated with a network device and the one or more server devices.

As further shown in FIG. 4, process 400 may include generating, based on the network information and the server information, an encapsulation profile for a tunnel encapsulation path (block 420). For example, the control platform (e.g., using computing resource 224, processor 320, storage component 340, and/or the like) may generate, based on the network information and the server information, an encapsulation profile for a tunnel encapsulation path, as described above in connection with FIGS. 1A-2.

As further shown in FIG. 4, process 400 may include generating, based on the network information and the server information, a route profile for the tunnel encapsulation path (block 430). For example, the control platform (e.g., using computing resource 224, processor 320, memory 330, and/or the like) may generate, based on the network information and the server information, a route profile for the tunnel encapsulation path, as described above in connection with FIGS. 1A-2.

As further shown in FIG. 4, process 400 may include providing, to the network device, the encapsulation profile for the tunnel encapsulation path and the route profile for the tunnel encapsulation path (block 440). For example, the control platform (e.g., using computing resource 224, processor 320, communication interface 370, and/or the like) may provide, to the network device, the encapsulation profile for the tunnel encapsulation path and the route profile for the tunnel encapsulation path, as described above in connection with FIGS. 1A-2.

As further shown in FIG. 4, process 400 may include providing, to the one or more server devices, the encapsulation profile for the tunnel encapsulation path, wherein the tunnel encapsulation path is provided between the network device and the one or more server devices, via the network, based on the encapsulation profile for the tunnel encapsulation path and the route profile for the tunnel encapsulation path (block 450). For example, the control platform (e.g., using computing resource 224, processor 320, communication interface 370, and/or the like) may provide, to the one or more server devices, the encapsulation profile for the tunnel encapsulation path, as described above in connection with FIGS. 1A-2. In some implementations, the tunnel encapsulation path may be provided between the network device and the one or more server devices, via the network, based on the encapsulation profile for the tunnel encapsulation path and the route profile for the tunnel encapsulation path Process 400 may include additional implementations, such as any single implementation or any combination of implementations described below and/or in connection with one or more other processes described elsewhere herein.

In some implementations, the control platform may generate a decapsulation profile for a tunnel decapsulation path based on the network information and the server information, may provide, to the network device, the decapsulation profile for the tunnel decapsulation path, and may provide, to the one or more server devices, the decapsulation profile for the tunnel decapsulation path, where the tunnel decapsulation path is provided between the network device and the one or more server devices, via the network, based on the decapsulation profile for the tunnel decapsulation path.

In some implementations, the control platform may generate another decapsulation profile for another tunnel decapsulation path based on the network information and the server information, and may aggregate the other decapsulation profile and the decapsulation profile to generate an aggregated decapsulation profile for an aggregated tunnel decapsulation path, where the aggregated tunnel decapsulation path combines the tunnel decapsulation path and the other tunnel decapsulation path. Additionally, the control platform may provide, to the network device, the aggregated decapsulation profile for the aggregated tunnel decapsulation path, and may provide, to the one or more server devices, the aggregated decapsulation profile for the aggregated tunnel decapsulation path, where the aggregated tunnel decapsulation path is provided between the network device and the one or more server devices, via the network, based on the aggregated decapsulation profile.

In some implementations, the control platform may receive a tunnel parameter change for the tunnel encapsulation path, and may cause the tunnel parameter change to be implemented by the network device and the one or more server devices, via the network. In some implementations, the encapsulation profile for the tunnel encapsulation path may include an application programming interface (API).

In some implementations, the encapsulation profile for the tunnel encapsulation path may include information indicating one or more of a source address for the tunnel encapsulation path, a destination address for the tunnel encapsulation path, a source port range for the tunnel encapsulation path, a destination port for the tunnel encapsulation path, or features to be associated with the tunnel encapsulation path. In some implementations, the one or more server devices may include one or more virtual machines, and the tunnel encapsulation path may be provided between the network device and one of the one or more virtual machines.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for generating flexible, programmable, and scalable network tunnels on demand. In some implementations, one or more process blocks of FIG. 5 may be performed by a control platform (e.g., control platform 220). In some implementations, one or more process blocks of FIG. 5 may be performed by another device or a group of devices separate from or including the control platform, such as a user device (e.g., user device 210), a network device (e.g., network device 240), and/or a server device (e.g., server device 250).

As shown in FIG. 5, process 500 may include receiving network information associated with a network and server information associated with one or more server devices, wherein the network is associated with a network device and the one or more server devices (block 510). For example, the control platform (e.g., using computing resource 224, processor 320, communication interface 370, and/or the like) may receive network information associated with a network and server information associated with one or more server devices, as described above in connection with FIGS. 1A-2. In some implementations, the network may be associated with a network device and the one or more server devices.

As further shown in FIG. 5, process 500 may include generating an encapsulation profile for a tunnel encapsulation path based on the network information and the server information (block 520). For example, the control platform (e.g., using computing resource 224, processor 320, memory 330, and/or the like) may generate an encapsulation profile for a tunnel encapsulation path based on the network information and the server information, as described above in connection with FIGS. 1A-2.

As further shown in FIG. 5, process 500 may include generating a route profile for the tunnel encapsulation path based on the network information and the server information (block 530). For example, the control platform (e.g., using computing resource 224, processor 320, storage component 340, and/or the like) may generate a route profile for the tunnel encapsulation path based on the network information and the server information, as described above in connection with FIGS. 1A-2.

As further shown in FIG. 5, process 500 may include generating a decapsulation profile for a tunnel decapsulation path based on the network information and the server information (block 540). For example, the control platform (e.g., using computing resource 224, processor 320, memory 330, and/or the like) may generate a decapsulation profile for a tunnel decapsulation path based on the network information and the server information, as described above in connection with FIGS. 1A-2.

As further shown in FIG. 5, process 500 may include providing, to the network device, the encapsulation profile for the tunnel encapsulation path, the route profile for the tunnel encapsulation path, and the decapsulation profile for the tunnel decapsulation path (block 550). For example, the control platform (e.g., using computing resource 224, processor 320, memory 330, communication interface 370, and/or the like) may provide, to the network device, the encapsulation profile for the tunnel encapsulation path, the route profile for the tunnel encapsulation path, and the decapsulation profile for the tunnel decapsulation path, as described above in connection with FIGS. 1A-2.

As further shown in FIG. 5, process 500 may include providing, to the one or more server devices, the encapsulation profile for the tunnel encapsulation path and the decapsulation profile for the tunnel decapsulation path, wherein the tunnel encapsulation path and the tunnel decapsulation path is provided between the network device and the one or more server devices, via the network, based on the encapsulation profile for the tunnel encapsulation path and the route profile for the tunnel encapsulation path, and wherein the tunnel decapsulation path is provided between the network device and the one or more server devices, via the network, based on the decapsulation profile for the tunnel decapsulation path (block 560). For example, the control platform (e.g., using computing resource 224, processor 320, communication interface 370, and/or the like) may provide, to the one or more server devices, the encapsulation profile for the tunnel encapsulation path and the decapsulation profile for the tunnel decapsulation path, as described above in connection with FIGS. 1A-2. In some implementations, the tunnel encapsulation path and the tunnel decapsulation path may be provided between the network device and the one or more server devices, via the network, based on the encapsulation profile for the tunnel encapsulation path and the route profile for the tunnel encapsulation path, and the tunnel decapsulation path may be provided between the network device and the one or more server devices, via the network, based on the decapsulation profile for the tunnel decapsulation path.

Process 500 may include additional implementations, such as any single implementation or any combination of implementations described below and/or in connection with one or more other processes described elsewhere herein.

In some implementations, each of the encapsulation profile and the decapsulation profile may include an application programming interface (API). In some implementations, the control platform may generate another decapsulation profile for another tunnel decapsulation path based on the network information and the server information, and may aggregate the other decapsulation profile and the decapsulation profile to generate an aggregated decapsulation profile for an aggregated tunnel decapsulation path, where the aggregated tunnel decapsulation path combines the tunnel decapsulation path and the other tunnel decapsulation path. Additionally, the control platform may provide, to the network device, the aggregated decapsulation profile for the aggregated tunnel decapsulation path, and may provide, to the one or more server devices, the aggregated decapsulation profile for the aggregated tunnel decapsulation path, where the aggregated tunnel decapsulation path is provided between the network device and the one or more server devices, via the network, based on the aggregated decapsulation profile.

In some implementations, the aggregated decapsulation profile may include an application programming interface (API). In some implementations, the control platform may receive a tunnel parameter change for the tunnel decapsulation path, and may cause the tunnel parameter change to be implemented by the network device and the one or more server devices, via the network.

In some implementations, the encapsulation profile for the tunnel encapsulation path may include information indicating one or more of a source address for the tunnel encapsulation path, a destination address for the tunnel encapsulation path, a source port range for the tunnel encapsulation path, a destination port for the tunnel encapsulation path, or features to be associated with the tunnel encapsulation path. In some implementations, the decapsulation profile for the tunnel decapsulation path may include information indicating one or more of a source address for the tunnel decapsulation path, a destination address for the tunnel decapsulation path, or a destination port for the tunnel decapsulation path.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for generating flexible, programmable, and scalable network tunnels on demand. In some implementations, one or more process blocks of FIG. 6 may be performed by a control platform (e.g., control platform 220). In some implementations, one or more process blocks of FIG. 6 may be performed by another device or a group of devices separate from or including the control platform, such as a user device (e.g., user device 210), a network device (e.g., network device 240), and/or a server device (e.g., server device 250).

As shown in FIG. 6, process 600 may include receiving network information associated with a network and server information associated with one or more server devices, wherein the network is associated with a network device and the one or more server devices (block 610). For example, the control platform (e.g., using computing resource 224, processor 320, communication interface 370, and/or the like) may receive network information associated with a network and server information associated with one or more server devices, as described above in connection with FIGS. 1A-2. In some implementations, the network may be associated with a network device and the one or more server devices.

As further shown in FIG. 6, process 600 may include generating, based on the network information and the server information, an encapsulation profile for a tunnel encapsulation path (block 620). For example, the control platform (e.g., using computing resource 224, processor 320, memory 330, and/or the like) may generate, based on the network information and the server information, an encapsulation profile for a tunnel encapsulation path, as described above in connection with FIGS. 1A-2.

As further shown in FIG. 6, process 600 may include generating, based on the network information and the server information, a route profile for the tunnel encapsulation path (block 630). For example, the control platform (e.g., using computing resource 224, processor 320, storage component 340, and/or the like) may generate, based on the network information and the server information, a route profile for the tunnel encapsulation path, as described above in connection with FIGS. 1A-2.

As further shown in FIG. 6, process 600 may include providing, to the network device, the encapsulation profile for the tunnel encapsulation path and the route profile for the tunnel encapsulation path (block 640). For example, the control platform (e.g., using computing resource 224, processor 320, memory 330, communication interface 370, and/or the like) may provide, to the network device, the encapsulation profile for the tunnel encapsulation path and the route profile for the tunnel encapsulation path, as described above in connection with FIGS. 1A-2.

As further shown in FIG. 6, process 600 may include providing, to the one or more server devices, the encapsulation profile for the tunnel encapsulation path, wherein the tunnel encapsulation path is provided between the network device and the one or more server devices, via the network, based on the encapsulation profile for the tunnel encapsulation path and the route profile for the tunnel encapsulation path (block 650). For example, the control platform (e.g., using computing resource 224, processor 320, storage component 340, communication interface 370, and/or the like) may provide, to the one or more server devices, the encapsulation profile for the tunnel encapsulation path, as described above in connection with FIGS. 1A-2. In some implementations, the tunnel encapsulation path may be provided between the network device and the one or more server devices, via the network, based on the encapsulation profile for the tunnel encapsulation path and the route profile for the tunnel encapsulation path.

As further shown in FIG. 6, process 600 may include receiving a tunnel parameter change for the tunnel encapsulation path (block 660). For example, the control platform (e.g., using computing resource 224, processor 320, communication interface 370, and/or the like) may receive a tunnel parameter change for the tunnel encapsulation path, as described above in connection with FIGS. 1A-2.

As further shown in FIG. 6, process 600 may include causing the tunnel parameter change to be implemented by the network device and the one or more server devices, via the network (block 670). For example, the control platform (e.g., using computing resource 224, processor 320, communication interface 370, and/or the like) may cause the tunnel parameter change to be implemented by the network device and the one or more server devices, via the network, as described above in connection with FIGS. 1A-2.

Process 600 may include additional implementations, such as any single implementation or any combination of implementations described below and/or in connection with one or more other processes described elsewhere herein.

In some implementations, the control platform may generate a decapsulation profile for a tunnel decapsulation path based on the network information and the server information, may provide, to the network device, the decapsulation profile for the tunnel decapsulation path, and may provide, to the one or more server devices, the decapsulation profile for the tunnel decapsulation path, where the tunnel decapsulation path is provided between the network device and the one or more server devices, via the network, based on the decapsulation profile for the tunnel decapsulation path.

In some implementations, the control platform may generate another decapsulation profile for another tunnel decapsulation path based on the network information and the server information, and may aggregate the other decapsulation profile and the decapsulation profile to generate an aggregated decapsulation profile for an aggregated tunnel decapsulation path, where the aggregated tunnel decapsulation path combines the tunnel decapsulation path and the other tunnel decapsulation path. Additionally, the control platform may provide, to the network device, the aggregated decapsulation profile for the aggregated tunnel decapsulation path, and may provide, to the one or more server devices, the aggregated decapsulation profile for the aggregated tunnel decapsulation path, where the aggregated tunnel decapsulation path is provided between the network device and the one or more server devices, via the network, based on the aggregated decapsulation profile.

In some implementations, the decapsulation profile for the tunnel decapsulation path may include information indicating one or more of a source address for the tunnel decapsulation path, a destination address for the tunnel decapsulation path, or a destination port for the tunnel decapsulation path. In some implementations, the encapsulation profile for the tunnel encapsulation path may include information indicating one or more of a source address for the tunnel encapsulation path, a destination address for the tunnel encapsulation path, a source port range for the tunnel encapsulation path, a destination port for the tunnel encapsulation path, or features to be associated with the tunnel encapsulation path. In some implementations, the one or more server devices may include one or more virtual machines, and the tunnel encapsulation path may be provided between the network device and one of the one or more virtual machines.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, network information associated with a network and server information associated with one or more server devices,
wherein the network is associated with a network device and the one or more server devices;
generating, by the device and based on the network information and the server information, an encapsulation profile for a tunnel encapsulation path;
generating, by the device and based on the network information and the server information, a route profile for the tunnel encapsulation path;
providing, by the device and to the network device, the encapsulation profile for the tunnel encapsulation path and the route profile for the tunnel encapsulation path; and
providing, by the device and to the one or more server devices, the encapsulation profile for the tunnel encapsulation path,
wherein the tunnel encapsulation path is provided between the network device and the one or more server devices, via the network, based on the encapsulation profile for the tunnel encapsulation path and the route profile for the tunnel encapsulation path.

2. The method of claim 1, further comprising:
generating a decapsulation profile for a tunnel decapsulation path based on the network information and the server information;
providing, to the network device, the decapsulation profile for the tunnel decapsulation path; and
providing, to the one or more server devices, the decapsulation profile for the tunnel decapsulation path,
wherein the tunnel decapsulation path is provided between the network device and the one or more server devices, via the network, based on the decapsulation profile for the tunnel decapsulation path.

3. The method of claim 2, further comprising:
generating another decapsulation profile for another tunnel decapsulation path based on the network information and the server information;
aggregating the other decapsulation profile and the decapsulation profile to generate an aggregated decapsulation profile for an aggregated tunnel decapsulation path,
wherein the aggregated tunnel decapsulation path combines the tunnel decapsulation path and the other tunnel decapsulation path;
providing, to the network device, the aggregated decapsulation profile for the aggregated tunnel decapsulation path; and
providing, to the one or more server devices, the aggregated decapsulation profile for the aggregated tunnel decapsulation path,
wherein the aggregated tunnel decapsulation path is provided between the network device and the one or more server devices, via the network, based on the aggregated decapsulation profile.

4. The method of claim 1, further comprising:
receiving a tunnel parameter change for the tunnel encapsulation path; and
causing the tunnel parameter change to be implemented by the network device and the one or more server devices, via the network.

5. The method of claim 1, wherein the encapsulation profile for the tunnel encapsulation path includes an application programming interface (API).

6. The method of claim 1, wherein the encapsulation profile for the tunnel encapsulation path includes information indicating one or more of:
a source address for the tunnel encapsulation path,
a destination address for the tunnel encapsulation path,
a source port range for the tunnel encapsulation path,
a destination port for the tunnel encapsulation path, or
features to be associated with the tunnel encapsulation path.

7. The method of claim 1, wherein the one or more server devices include one or more virtual machines, and
wherein the tunnel encapsulation path is provided between the network device and one of the one or more virtual machines.

8. A device, comprising:
one or more memories; and
one or more processors to:
receive network information associated with a network and server information associated with one or more server devices,
wherein the network is associated with a network device and the one or more server devices;
generate an encapsulation profile for a tunnel encapsulation path based on the network information and the server information;
generate a route profile for the tunnel encapsulation path based on the network information and the server information;
generate a decapsulation profile for a tunnel decapsulation path based on the network information and the server information;
provide, to the network device, the encapsulation profile for the tunnel encapsulation path, the route profile for the tunnel encapsulation path, and the decapsulation profile for the tunnel decapsulation path; and
provide, to the one or more server devices, the encapsulation profile for the tunnel encapsulation path and the decapsulation profile for the tunnel decapsulation path,
wherein the tunnel encapsulation path and the tunnel decapsulation path is provided between the network device and the one or more server devices, via the network, based on the encapsulation profile for the tunnel encapsulation path and the route profile for the tunnel encapsulation path, and
wherein the tunnel decapsulation path is provided between the network device and the one or more server devices, via the network, based on the decapsulation profile for the tunnel decapsulation path.

9. The device of claim 8, wherein each of the encapsulation profile and the decapsulation profile includes an application programming interface (API).

10. The device of claim 8, wherein the one or more processors are further to:
generate another decapsulation profile for another tunnel decapsulation path based on the network information and the server information;
aggregate the other decapsulation profile and the decapsulation profile to generate an aggregated decapsulation profile for an aggregated tunnel decapsulation path,
wherein the aggregated tunnel decapsulation path combines the tunnel decapsulation path and the other tunnel decapsulation path;
provide, to the network device, the aggregated decapsulation profile for the aggregated tunnel decapsulation path; and
provide, to the one or more server devices, the aggregated decapsulation profile for the aggregated tunnel decapsulation path,
wherein the aggregated tunnel decapsulation path is provided between the network device and the one or more server devices, via the network, based on the aggregated decapsulation profile.

11. The device of claim 10, wherein the aggregated decapsulation profile includes an application programming interface (API).

12. The device of claim 8, wherein the one or more processors are further to:
receive a tunnel parameter change for the tunnel decapsulation path; and
cause the tunnel parameter change to be implemented by the network device and the one or more server devices, via the network.

13. The device of claim 8, wherein the encapsulation profile for the tunnel encapsulation path includes information indicating one or more of:

a source address for the tunnel encapsulation path,
a destination address for the tunnel encapsulation path,
a source port range for the tunnel encapsulation path,
a destination port for the tunnel encapsulation path, or
features to be associated with the tunnel encapsulation path.

14. The device of claim 8, wherein the decapsulation profile for the tunnel decapsulation path includes information indicating one or more of:
a source address for the tunnel decapsulation path,
a destination address for the tunnel decapsulation path, or
a destination port for the tunnel decapsulation path.

15. A non-transitory computer-readable medium storing instructions, the instructions comprising:
one or more instructions that, when executed by one or more processors of a device, cause the one or more processors to:
receive network information associated with a network and server information associated with one or more server devices,
wherein the network is associated with a network device and the one or more server devices;
generate, based on the network information and the server information, an encapsulation profile for a tunnel encapsulation path;
generate, based on the network information and the server information, a route profile for the tunnel encapsulation path;
provide, to the network device, the encapsulation profile for the tunnel encapsulation path and the route profile for the tunnel encapsulation path;
provide, to the one or more server devices, the encapsulation profile for the tunnel encapsulation path,
wherein the tunnel encapsulation path is provided between the network device and the one or more server devices, via the network, based on the encapsulation profile for the tunnel encapsulation path and the route profile for the tunnel encapsulation path;
receive a tunnel parameter change for the tunnel encapsulation path; and
cause the tunnel parameter change to be implemented by the network device and the one or more server devices, via the network.

16. The non-transitory computer-readable medium of claim 15, wherein the instructions further comprise:
one or more instructions that, when executed by the one or more processors, cause the one or more processors to:
generate a decapsulation profile for a tunnel decapsulation path based on the network information and the server information;
provide, to the network device, the decapsulation profile for the tunnel decapsulation path; and
provide, to the one or more server devices, the decapsulation profile for the tunnel decapsulation path,
wherein the tunnel decapsulation path is provided between the network device and the one or more server devices, via the network, based on the decapsulation profile for the tunnel decapsulation path.

17. The non-transitory computer-readable medium of claim 16, wherein the instructions further comprise:
one or more instructions that, when executed by the one or more processors, cause the one or more processors to:
generate another decapsulation profile for another tunnel decapsulation path based on the network information and the server information;
aggregate the other decapsulation profile and the decapsulation profile to generate an aggregated decapsulation profile for an aggregated tunnel decapsulation path,
wherein the aggregated tunnel decapsulation path combines the tunnel decapsulation path and the other tunnel decapsulation path;
provide, to the network device, the aggregated decapsulation profile for the aggregated tunnel decapsulation path; and
provide, to the one or more server devices, the aggregated decapsulation profile for the aggregated tunnel decapsulation path,
wherein the aggregated tunnel decapsulation path is provided between the network device and the one or more server devices, via the network, based on the aggregated decapsulation profile.

18. The non-transitory computer-readable medium of claim 16, wherein the decapsulation profile for the tunnel decapsulation path includes information indicating one or more of:
a source address for the tunnel decapsulation path,
a destination address for the tunnel decapsulation path, or
a destination port for the tunnel decapsulation path.

19. The non-transitory computer-readable medium of claim 15, wherein the encapsulation profile for the tunnel encapsulation path includes information indicating one or more of:
a source address for the tunnel encapsulation path,
a destination address for the tunnel encapsulation path,
a source port range for the tunnel encapsulation path,
a destination port for the tunnel encapsulation path, or
features to be associated with the tunnel encapsulation path.

20. The non-transitory computer-readable medium of claim 15, wherein the one or more server devices include one or more virtual machines, and
wherein the tunnel encapsulation path is provided between the network device and one of the one or more virtual machines.

\* \* \* \* \*